US010554988B2

(12) United States Patent
Said et al.

(10) Patent No.: US 10,554,988 B2
(45) Date of Patent: Feb. 4, 2020

(54) BINARY ARITHMETIC CODING WITH PARAMETERIZED PROBABILITY ESTIMATION FINITE STATE MACHINES

(71) Applicant: QUALCOMM Incorporated, San Diego, CA (US)

(72) Inventors: Amir Said, San Diego, CA (US); Marta Karczewicz, San Diego, CA (US); Li Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 15/927,753

(22) Filed: Mar. 21, 2018

(65) Prior Publication Data

US 2018/0278946 A1   Sep. 27, 2018

Related U.S. Application Data

(60) Provisional application No. 62/475,609, filed on Mar. 23, 2017, provisional application No. 62/474,919, filed on Mar. 22, 2017.

(51) Int. Cl.
*H04N 19/44* (2014.01)
*H04N 19/189* (2014.01)
*H04N 19/70* (2014.01)

(52) U.S. Cl.
CPC ........... *H04N 19/189* (2014.11); *H04N 19/44* (2014.11); *H04N 19/70* (2014.11)

(58) Field of Classification Search
CPC ....... H04N 19/189; H04N 19/70; H04N 19/44
See application file for complete search history.

(56) References Cited

U.S. PATENT DOCUMENTS 9,130,585 B2 * 9/2015 Marpe ................. H03M 7/4081
9,521,433 B2 * 12/2016 Chono ................. H04N 19/196
2013/0230097 A1   9/2013 Sole Rojals et al.
(Continued)

FOREIGN PATENT DOCUMENTS

WO   2016196287 A1   12/2016

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Tsion B Owens
(74) *Attorney, Agent, or Firm* — Shumaker & Sieffert, P.A.

(57) ABSTRACT

For at least one respective bin of the bin stream, a decoder may determine, based on a state for the respective bin, an interval for the respective bin, and the offset value, a value of the respective bin. Additionally, the decoder determines one or more Finite State Machine (FSM) parameters for a next bin of the bin stream. The one or more FSM parameters for the next bin controls how probability estimates for the next bin are computed from a state for the respective bin. The decoder determines using a parameterized state updating function that takes as input the state for the respective bin, the one or more FSM parameters for the next bin of the bin stream, and the value of the respective bin, a state for the next bin of the bin stream. The decoder may debinarize the bin stream to form a decoded syntax element.

40 Claims, 15 Drawing Sheets

(56) References Cited

U.S. PATENT DOCUMENTS

| | | | |
|---|---|---|---|
| 2014/0177708 A1 | 6/2014 | Alshin et al. | |
| 2016/0353110 A1* | 12/2016 | Zhang | H04N 19/13 |
| 2019/0110080 A1 | 4/2019 | Said et al. | |

OTHER PUBLICATIONS

Said, A., "Introduction to Arithmetic Coding—Theory and Practice," Lossless Compression Handbook by Khalid Saywood, Hewlett Packard Laboratories, Technical Report HPL-2004-76, Apr. 21, 2004, 67 pp.

Marpe, D., et al., "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.

Richardson, I., "The H.264 Advanced Video Compression Standard", Second Edition, John Wiley and Sons, Ltd, 2010, 337 pp.

Sze, V., et al., "High Throughput CABAC Entropy Coding in HEVC," IEEE Transactions on Circuits and Systems for Video Technology, vol. 22, No. 12, Dec. 2012, pp. 1778-1791.

Wien, M., "High Efficiency Video Coding, Coding Tools and Specification", Springer-Verlag, Berlin, Sep. 2015, 30 pp.

Mukherjee, D., et al. "The latest open-source video codec VP9—an overview and preliminary results," in Proc. 30th Picture Coding Symp., San Jose, CA, Dec. 2013. (Marked Confidential).

Alshin, A., et al., "High precision probability estimation for CABAC," In Proc. IEEE Visual Commun. Image Process, Conf. Kuching, Malyasia, Nov. 2013, 6 pp.

Alshin A., et al., "Multi-Parameter Probability Up-Date for CABAC", Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F254, 5 pp.

Belyaev E., et al., "Binary Arithmetic Coding System with Adaptive Probability Estimation by Virtual Sliding Window", 2006 IEEE Tenth International Symposium, IEEE, Jun. 28, 2006, 5 pp.

Chen J., et al., "Further Improvements to HMKTA-1.0", 52. VCEG meeting, Jun. 19, 2015-Jun. 26, 2015, Warsaw, (Video Coding Experts Group Of ITU-T SG.16), No. VCEG-AZ07, 8 pp.

International Search Report and Written Opinion of International Application No. PCT/US2018/023754, dated Jun. 28, 2018, 18 pp.

Cui J., et al., "An Optimized Probability Estimation Model for Binary Arithmetic Coding", 2015 Visual Communications and Image Processing (VCIP), IEEE, Dec. 13, 2015, 4 pp.

Said A., et al., "Arithmetic Coding with Context-Dependent Double-Window Adaptation Response", Joint Video Exploration Team (JVET) of ITU-T SG16 WP3 and ISO/IEC JTC1/SC29/WG11, 7th Meeting: Torino, IT, Jul. 13-21, 2017, JVET-G0112, 4 pp.

Said A., et al., "EE2 related: Arithmetic Coding with Progressive Context-Dependent Double-Window Adaptation Response", Joint Video Exploration Team (JVET) of ITU-T SG16 WP3 and ISO/IEC JTC1/SC29/WG11, 8th Meeting: Macao, CN, Oct. 18-24, 2017, JVET-H0067, 9 pp.

Stegemann J., et al., "Counter-Based Probability Model Update with Adapted Arithmetic Coding Engine", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTV-G547, 4 pp.

Witten I., et al., "Arithmetic Coding for Data Compression", Communications of the ACM, vol. 30, No. 6, Jun. 1987, 21 pp.

Said A., "Arithmetic Coding", Lossless Compression Handbook, K. Sayood, Ed., Academic Press, Chapter 5, 2003, pp. 101-152.

Leighton, F.T et al., "Estimating a Probability Using Finite Memory", IEEE Transactions on Information Theory, vol. 32, No. 6, Nov. 1986, pp. 733-742.

Meron, E., et al., Finite-Memory Universal Prediction of Individual Sequences, IEEE Transactions on Information Theory, vol. 50, No. 7, Jul. 2004, pp. 1506-1523.

Howard, P., et al. "Practical Implementations of Arithmetic Coding", Image and Text Compression, J.A. Storer, Ed., Chapter 4, Kluwer Academic Publishers, Norwell, MA, 1992, pp. 85-112.

Pennebaker, W.B., et al. "Probability estimation for the Q-Coder", International Business Machines Corporation, IBM J. Res. Develop. vol. 32, No. 6, Nov. 1988, pp. 737-752.

Oppenheim, A., et al., "Discrete-Time Signal Processing", Chapter 6: "Structures for Discrete-Time Systems", Prentice-Hall, Inc., Saddle River, NJ, 3rd Edition., Aug. 2009, 122 pp.

Mitra, S.K., "Digital Signal Processing: A Computer-based Approach", Chapter 8: "Digital Filter Structures", McGraw-Hill Publishing Co, New York, NY, 4th Ed., 2010, pp. 417-488.

Sze, V., et al., "Entropy Coding in HEVC", Chapter 8, High Efficiency Video Coding (HEVC): Algorithms and Architectures, Integrated Circuits and Systems, Springer International Publishing Switzerland, 2014, 61 pp.

Chen, J., et al., "Algorithm Description of Joint Exploration Test Model 5 (JEM 5)", Joint Video Exploration Team (JVET) of ITU-T SG16 WP3 and ISO/IEC JTC1/SC29/WG11, 5th Meeting: Geneva, CH, Jan. 12-20, 2017, JVET-E1001-v2, 44 pp.

* cited by examiner

BINARY ARITHMETIC CODING WITH PARAMETERIZED PROBABILITY ESTIMATION FINITE STATE MACHINES

This application claims the benefit of U.S. Provisional Patent Application 62/474,919, filed Mar. 22, 2017, and U.S. Provisional Patent Application 62/475,609, filed Mar. 23, 2017, the entire content of each of which is incorporated by reference.

TECHNICAL FIELD

This disclosure relates to video coding, e.g., video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to arithmetic coding. As described herein, the techniques of this disclosure may improve compression of video data by potentially improving adaptive probability estimation.

In one example, this disclosure describes a method of decoding video data, the method comprising: determining a decoded syntax element by applying binary arithmetic decoding to an offset value included in a bitstream, wherein applying the binary arithmetic decoding comprises: generating a bin stream, wherein generating the bin stream comprises: for at least one respective bin of the bin stream: determining a value of the respective bin based on a state for the respective bin, an interval for the respective bin, and the offset value; determining one or more Finite State Machine (FSM) parameters for a next bin of the bin stream, the one or more FSM parameters for the next bin controlling how probability estimates for the next bin are computed from a state for the respective bin, the next bin of the bin stream following the respective bin in the bin stream; and determining a state for the next bin of the bin stream using a parameterized state updating function that takes as input the state for the respective bin, the one or more FSM parameters for the next bin of the bin stream, and the value of the respective bin; and debinarizing the bin stream to form the decoded syntax element; and reconstructing a picture of the video data based in part on the decoded syntax element.

In another example, this disclosure describes a method of encoding video data, the method comprising: generating a syntax element based on the video data; determining an offset value at least in part by applying binary arithmetic encoding to the syntax element, wherein applying the binary arithmetic encoding comprises: generating a bin stream at least in part by: binarizing the syntax element; for at least one respective bin of the bin stream: determining an interval for a next bin of the bin stream based on a state for the respective bin, an interval for the respective bin, and a value of the respective bin; determining one or more Finite State Machine (FSM) parameters for the next bin of the bin stream, the one or more FSM parameters for the next bin controlling how probability estimates for the next bin are computed from a state for the respective bin; and determining a state for the next bin of the bin stream using a parameterized state updating function that takes as input the state for the respective bin, the one or more FSM parameters for the next bin of the bin stream, and the value of the respective bin, wherein the offset value is equal to a value in the interval for a last bin of the bin stream; and outputting a bitstream comprising the offset value.

In another example, this disclosure describes an apparatus for decoding video data, the apparatus comprising: one or more storage media configured to store video data; and one or more processors configured to: determine a decoded syntax element by applying binary arithmetic decoding to an offset value included in a bitstream, wherein the one or more processors are configured such that, as part of applying the binary arithmetic decoding, the one or more processors: generate a bin stream, wherein, as part of generating the bin stream, the one or more processors: for at least one respective bin of the bin stream: determine a value of the respective bin based on a state for the respective bin, an interval for the respective bin, and the offset value; determine one or more Finite State Machine (FSM) parameters for a next bin of the bin stream, the one or more FSM parameters for the next bin controlling how probability estimates for the next bin are computed from a state for the respective bin, the next bin of the bin stream following the respective bin in the bin stream; and determine a state for the next bin of the bin stream using a parameterized state updating function that takes as input the state for the respective bin, the one or more FSM parameters for the next bin of the bin stream, and the value of the respective bin; and debinarize the bin stream to form the decoded syntax element; and reconstruct a picture of the video data based in part on the decoded syntax element.

In another example, this disclosure describes an apparatus for encoding video data, the apparatus comprising: one or more storage media configured to store video data; and one or more processing circuits coupled to the one or more storage media, the one or more processing circuits configured to: generate a syntax element based on the video data; determine an offset value at least in part by applying binary arithmetic encoding to the syntax element, wherein the one or more processors are configured such that, as part of applying the binary arithmetic encoding, the one or more processors generate a bin stream at least in part by: binarizing the syntax element; and for at least one respective bin of the bin stream: determine an interval for a next bin of the bin stream based on a state for the respective bin, an interval for the respective bin, and a value of the respective bin; determine one or more Finite State Machine (FSM) parameters for the next bin of the bin stream, the one or more FSM parameters for the next bin controlling how probability estimates for the next bin are computed from a state for the respective bin; and determine a state for the next bin of the bin stream using a parameterized state updating function that takes as input the state for the respective bin, the one or more FSM parameters for the next bin of the bin stream, and the value of the respective bin, wherein the offset value is equal to a value in the interval for a last bin of the bin stream; and output a bitstream comprising the offset value.

In another example, this disclosure describes an apparatus for decoding video data, the apparatus comprising: means for determining a decoded syntax element by applying binary arithmetic decoding to an offset value included in a bitstream, wherein applying the binary arithmetic decoding comprises: generating a bin stream, wherein generating the bin stream comprises: for at least one respective bin of the bin stream: determining a value of the respective bin based on a state for the respective bin, an interval for the respective bin, and the offset value; determining one or more Finite State Machine (FSM) parameters for a next bin of the bin stream, the one or more FSM parameters for the next bin controlling how probability estimates for the next bin are computed from a state for the respective bin, the next bin of the bin stream following the respective bin in the bin stream; and determining a state for the next bin of the bin stream using a parameterized state updating function that takes as input the state for the respective bin, the one or more FSM parameters for the next bin of the bin stream, and the value of the respective bin; and debinarizing the bin stream to form the decoded syntax element; and means for reconstructing a picture of the video data based in part on the decoded syntax element.

In another example, this disclosure describes an apparatus for encoding video data, the apparatus comprising: means for generating a syntax element based on the video data; means for determining an offset value at least in part by applying binary arithmetic encoding to the syntax element, wherein applying the binary arithmetic encoding comprises generating a bin stream at least in part by: binarizing the syntax element; and for at least one respective bin of the bin stream: determining an interval for a next bin of the bin stream based on a state for the respective bin, an interval for the respective bin, and a value of the respective bin; determining one or more Finite State Machine (FSM) parameters for the next bin of the bin stream, the one or more FSM parameters for the next bin controlling how probability estimates for the next bin are computed from a state for the respective bin; and determining a state for the next bin of the bin stream using a parameterized state updating function that takes as input the state for the respective bin, the one or more FSM parameters for the next bin of the bin stream, and the value of the respective bin, wherein the offset value is equal to a value in the interval for a last bin of the bin stream; and means for outputting a bitstream comprising the offset value.

In another example, this disclosure describes a computer-readable storage medium storing instructions that, when executed, cause one or more processors to: determine a decoded syntax element by applying binary arithmetic decoding to an offset value included in a bitstream, wherein as part of causing the one or more processors to apply the binary arithmetic decoding, execution of the instructions causes the one or more processors to: generate a bin stream, wherein as part of causing the one or more processors to generate the bin stream, execution of the instructions causes the one or more processors to: for at least one respective bin of the bin stream: determine a value of the respective bin based on a state for the respective bin, an interval for the respective bin, and the offset value; determine one or more Finite State Machine (FSM) parameters for a next bin of the bin stream, the one or more FSM parameters for the next bin controlling how probability estimates for the next bin are computed from a state for the respective bin, the next bin of the bin stream following the respective bin in the bin stream; and determine a state for the next bin of the bin stream using a parameterized state updating function that takes as input the state for the respective bin, the one or more FSM parameters for the next bin of the bin stream, and the value of the respective bin; and debinarize the bin stream to form the decoded syntax element; and reconstruct a picture of the video data based in part on the decoded syntax element.

In another example, this disclosure describes a computer-readable storage medium storing instructions that, when executed, cause one or more processors to: generate a syntax element based on video data; determine an offset value at least in part by applying binary arithmetic encoding to the syntax element, wherein as part of causing the one or more processors to apply the binary arithmetic encoding, execution of the instructions causes the one or more processors to generate a bin stream at least in part by causing the one or more processors to: binarize the syntax element; and for at least one respective bin of the bin stream: determine an interval for a next bin of the bin stream based on a state for the respective bin, an interval for the respective bin, and a value of the respective bin; determine one or more Finite State Machine (FSM) parameters for the next bin of the bin stream, the one or more FSM parameters for the next bin controlling how probability estimates for the next bin are computed from a state for the respective bin; and determine a state for the next bin of the bin stream using a parameterized state updating function that takes as input the state for the respective bin, the one or more FSM parameters for the next bin of the bin stream, and the value of the respective bin, wherein the offset value is equal to a value in the interval for a last bin of the bin stream; and output a bitstream comprising the offset value.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
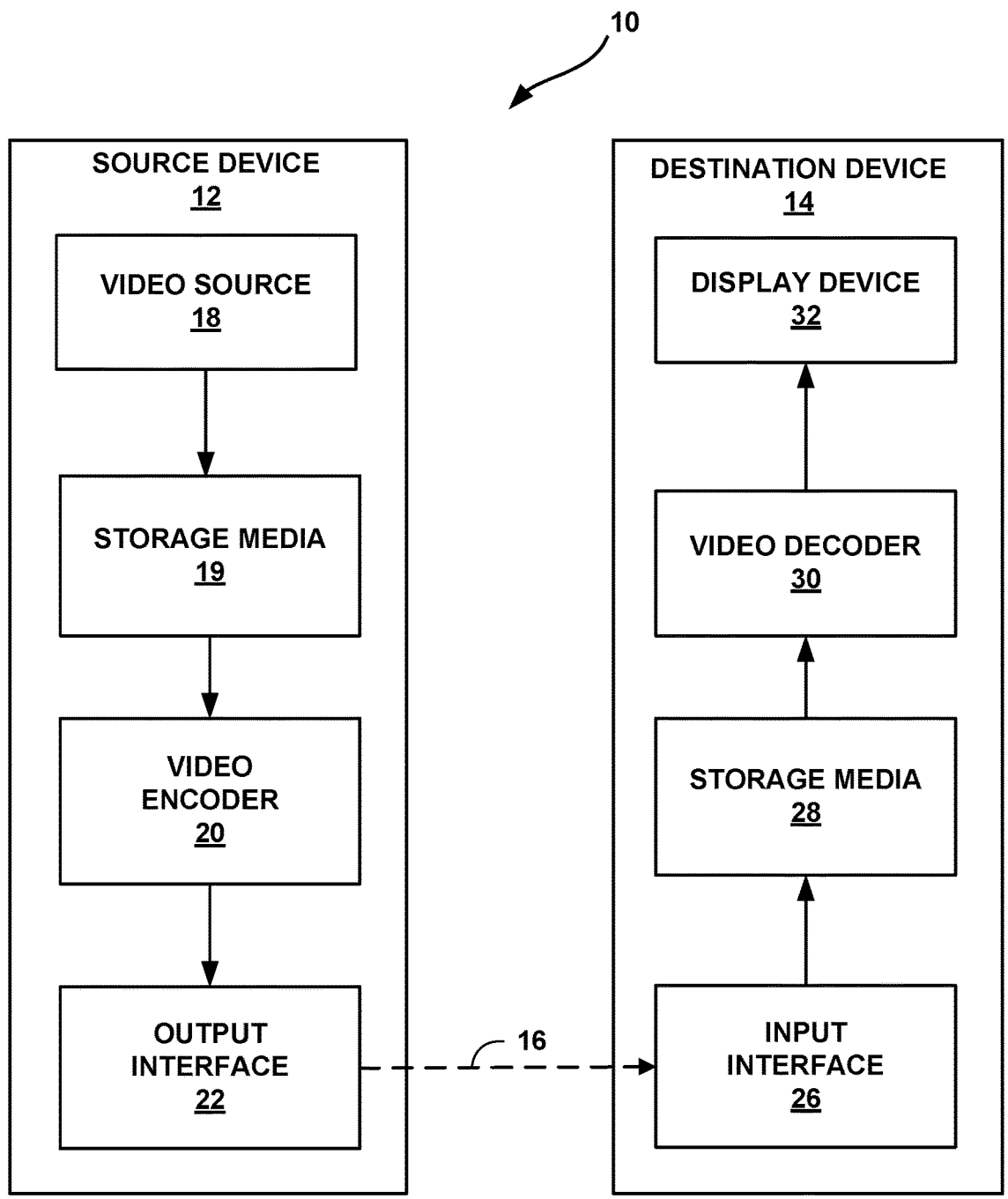
FIG. 1 is a block diagram illustrating an example video encoding and decoding system that may use one or more techniques described in this disclosure.

Arithmetic coding is frequently used in video coding to provide data compression. In a typical arithmetic encoding process, a video encoder selects a coding context that is associated with initial probability estimates for a first binary symbol and a second binary symbol. The video encoder uses the probability estimates and a value of a bin of a bin stream to determine an offset value. Additionally, the video encoder may use a state update function based on the bin value to update the probability estimates. The video encoder may then use the updated probability estimates and a next bin value of the bin stream to update the offset value. This process of updating the probability estimates and the offset value may continue until the video encoder reaches an end of the bin stream.

Conversely, a video decoder may receive a byte stream that includes the offset value. The video decoder selects the same coding context selected by the video encoder and uses the probability estimates specified by the coding context to determine a pair of sub-intervals, each of which corresponds to a different bin value. If the offset value is in a first sub-interval, the video decoder decodes a first bin value. If the offset value is in a second sub-interval, the video decoder decodes a second bin value. The video decoder may then use the state update function to update the probability estimates based on the decoded bin value. The video decoder uses the updated probability estimates to determine the sub-intervals again, with a lower end of the updated lower sub-interval being equal to the low end of the previous lower sub-interval if the offset value was in the previous lower sub-interval and equal to the low end of the previous upper sub-interval if the offset was in the previous upper sub-interval. The video decoder may continue this process until the video decoder reaches an end of the byte stream. The video decoder may de-binarize the resulting bin stream to determine values of one or more syntax elements.

In the arithmetic encoding and arithmetic decoding processes described above, the video encoder and the video decoder update the probability estimates using a state update function. The video encoder and the video decoder use the same state update function for all coding contexts and when coding all types of syntax elements. However, as described in this disclosure, using different state update functions in different situations may result in improved coding efficiency and bit rate reductions. This may, in turn, result in improved picture quality and/or reduced bandwidth consumption.

In one example of this disclosure, a video encoder generates a syntax element based on the video data and determines an offset value by applying binary arithmetic encoding to the syntax element. As part of applying the binary arithmetic encoding, the video encoder generates a bin stream by binarizing the syntax element. Additionally, for at least one respective bin of the bin stream, the video encoder determines, based on a state for the respective bin, an interval for the respective bin, and a value of the respective bin, an interval for a next bin of the bin stream. The video encoder also determines one or more Finite State Machine (FSM) parameters for the next bin of the bin stream. The one or more FSM parameters for the next bin control how probability estimates for the next bin are computed from a state for the respective bin. Additionally, the video encoder may determine a state for the next bin of the bin stream using a parameterized state updating function. The parameterized state updating function takes as input the state for the respective bin, the one or more FSM parameters for the next bin of the bin stream, and the value of the respective bin. In this example, the offset value is equal to a value in the interval for a last bin of the bin stream. The video encoder may output a bitstream comprising the offset value.

In another example of this disclosure, a video decoder may determine a decoded syntax element by applying binary arithmetic decoding to an offset value included in a bitstream. As part of applying the binary arithmetic decoding, the video decoder may generate a bin stream. As part of generating the bin stream, for at least one respective bin of the bin stream, the video decoder may determine a value of the respective bin. The video decoder may make this determination based on a state for the respective bin, an interval for the respective bin, and the offset value. Furthermore, the video decoder may determine one or more FSM parameters for a next bin of the bin stream. The one or more FSM parameters for the next bin control how probability estimates for the next bin are computed from a state for the respective bin. The next bin of the bin stream follows the respective bin in the bin stream. In addition, the video decoder determines a state for the next bin of the bin stream using a parameterized state updating function. The parameterized state updating function takes as input the state for the respective bin, the one or more FSM parameters for the next bin of the bin stream, and the value of the respective bin. The video decoder may debinarize the bin stream to form the decoded syntax element. Furthermore, the video decoder may reconstruct a picture of the video data based in part on the decoded syntax element.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. Source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video encoder/decoder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive encoded video data via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to the High Efficiency Video Coding (HEVC), which as known as or ITU-T H.265, its range and screen content coding extensions, its 3D video coding extension (3D-HEVC), its multiview extension (MV-HEVC), or its scalable extension (SHVC).

This disclosure may generally refer to "signaling" certain information, such as syntax elements. The term "signaling" may generally refer to the communication of syntax elements and/or other data used to decode the encoded video data. Such communication may occur in real- or near-real-time. Alternately, such communication may occur over a span of time, such as might occur when storing syntax elements to a computer-readable storage medium in an bitstream at the time of encoding, which then may be retrieved by a decoding device at any time after being stored to this medium.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction_unit" syntax structure within a "coding_unit" syntax structure for inter predicted PUs, but does not generate a "prediction_unit" syntax structure within a "coding_unit" syntax structure for intra predicted PUs. Rather, in HEVC, syntax elements related to intra predicted PUs are included directly in the "coding_unit" syntax structure.

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block.

Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. Quantization may reduce the bit depth associated with some or all the transform coefficients. For example, an n-bit transform coefficient may be rounded down to an m-bit transform coefficient during quantization, where n is greater than m. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Inverse quantization maps quantized value to a reconstructed value. For instance, video decoder 30 may inverse quantize a value by determining the value multiplied by a quantization step size. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As mentioned above, video encoder 20 and video decoder 30 may apply CABAC encoding and decoding to syntax elements as part of a video coding and compression scheme. To apply CABAC encoding to a syntax element, video encoder 20 may binarize the syntax element to form a series of one or more bits, which are referred to as "bins." In addition, video encoder 20 may identify a coding context. The coding context may identify initial probabilities of bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

Video encoder 20 may encode some bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 20 and video decoder 30. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of 1/2 for both symbols (0 and 1). Consequently, in bypass CABAC coding, the intervals are split directly in half.

Figure 2:
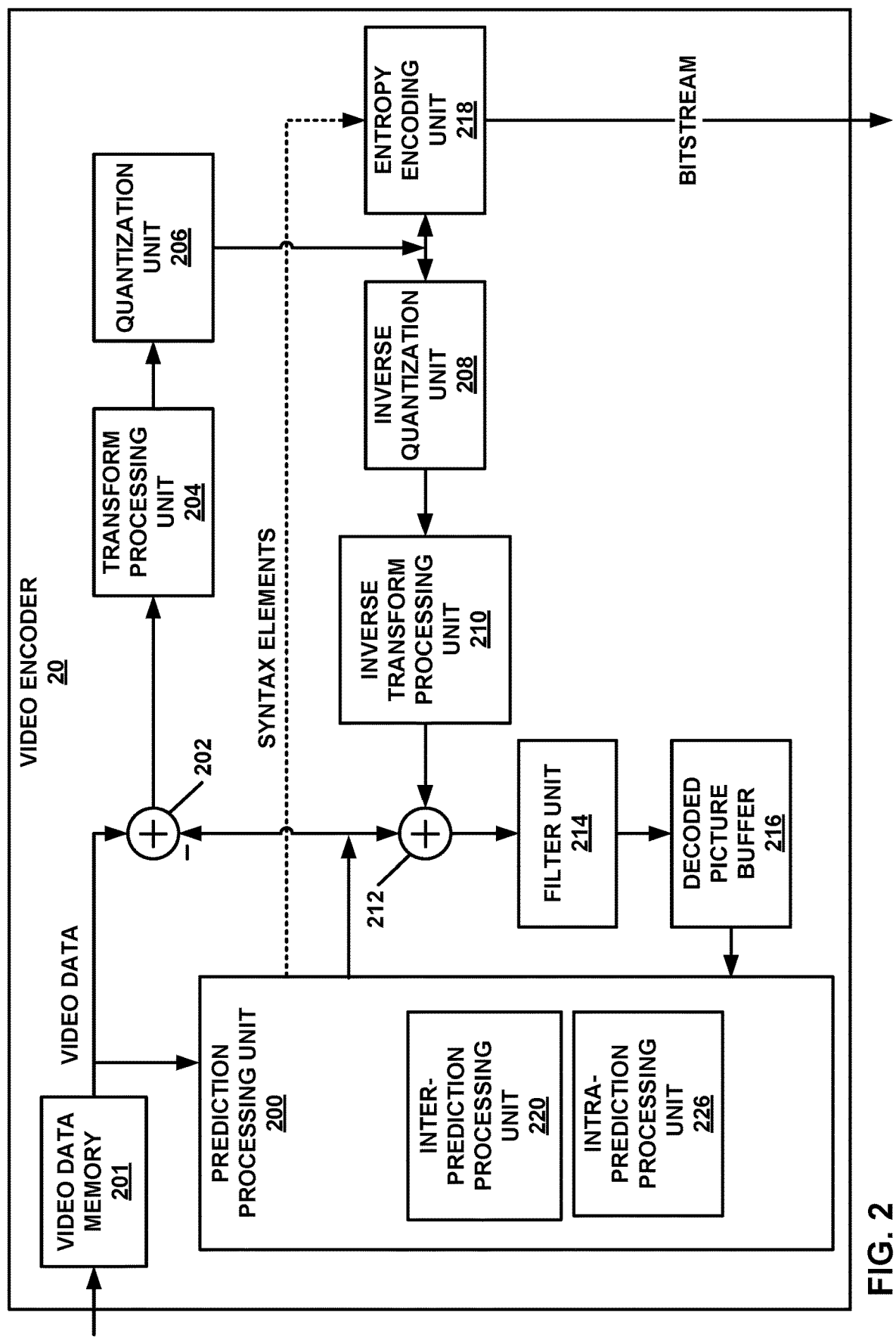
FIG. 2 is a block diagram illustrating an example video encoder that may implement one or more techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 2 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 2 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 2, video encoder 20 includes a prediction processing unit 200, video data memory 201, a residual generation unit 102, a transform processing unit 204, a quantization unit 206, an inverse quantization unit 208, an inverse transform processing unit 210, a reconstruction unit 212, a filter unit 214, a decoded picture buffer 216, and an entropy encoding unit 218. Prediction processing unit 200 includes an inter-prediction processing unit 220 and an intra-prediction processing unit 226. Inter-prediction processing unit 220 may include a motion estimation unit and a motion compensation unit (not shown).

Video data memory 201 may be configured to store video data to be encoded by the components of video encoder 20. The video data stored in video data memory 201 may be obtained, for example, from video source 18. Decoded picture buffer 216 may be a reference picture memory that stores reference video data for use in encoding video data by video encoder 20, e.g., in intra- or inter-coding modes. Video data memory 201 and decoded picture buffer 216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 201 and decoded picture buffer 216 may be provided by the same memory device or separate memory devices. In various examples, video data memory 201 may be on-chip with other components of video encoder 20, or off-chip relative to those components. Video data memory 201 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 200 may perform partitioning to divide the CTBs of the CTU into progressively-smaller blocks. The smaller blocks may be coding blocks of CUs. For example, prediction processing unit 200 may partition a CTB associated with a CTU according to a tree structure.

Video encoder 20 may encode CUs of a CTU to generate encoded representations of the CUs (i.e., coded CUs). As part of encoding a CU, prediction processing unit 200 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 220 may generate predictive data for a PU. As part of generating the predictive data for a PU, inter-prediction processing unit 220 performs inter prediction on the PU. The predictive data for the PU may include predictive blocks of the PU and motion information for the PU. Inter-prediction processing unit 220 may perform different operations for a PU of a CU depending on whether the PU is in an I slice, a P slice, or a B slice. In an I slice, all PUs are intra predicted. Hence, if the PU is in an I slice, inter-prediction processing unit 220 does not perform inter prediction on the PU. Thus, for blocks encoded in I-mode, the predicted block is formed using spatial prediction from previously-encoded neighboring blocks within the same frame. If a PU is in a P slice, inter-prediction processing unit 220 may use uni-directional inter prediction to generate a predictive block of the PU. If a PU is in a B slice, inter-prediction processing unit 220 may use uni-directional or bi-directional inter prediction to generate a predictive block of the PU.

Intra-prediction processing unit 226 may generate predictive data for a PU by performing intra prediction on the PU. The predictive data for the PU may include predictive blocks of the PU and various syntax elements. Intra-prediction processing unit 226 may perform intra prediction on PUs in I slices, P slices, and B slices.

To perform intra prediction on a PU, intra-prediction processing unit 226 may use multiple intra prediction modes to generate multiple sets of predictive data for the PU.

Intra-prediction processing unit 226 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 226 may use various numbers of intra prediction modes, e.g., 33 directional intra prediction modes. In some examples, the number of intra prediction modes may depend on the size of the region associated with the PU.

Prediction processing unit 200 may select the predictive data for PUs of a CU from among the predictive data generated by inter-prediction processing unit 220 for the PUs or the predictive data generated by intra-prediction processing unit 226 for the PUs. In some examples, prediction processing unit 200 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 204 may partition the residual blocks of a CU into transform blocks of TUs of the CU. For instance, transform processing unit 204 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 204 may generate transform coefficient blocks for each TU of a CU by applying one or more transforms to the transform blocks of the TU. Transform processing unit 204 may apply various transforms to a transform block associated with a TU. For example, transform processing unit 204 may apply a discrete cosine transform (DCT), a directional transform, or a conceptually similar transform to a transform block. In some examples, transform processing unit 204 does not apply transforms to a transform block. In such examples, the transform block may be treated as a transform coefficient block.

Quantization unit 206 may quantize the transform coefficients in a coefficient block. Quantization unit 206 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 208 and inverse transform processing unit 210 may apply inverse quantization and inverse transforms to a coefficient block, respectively, to reconstruct a residual block from the coefficient block. Reconstruction unit 212 may add the reconstructed residual block to corresponding samples from one or more predictive blocks generated by prediction processing unit 200 to produce a reconstructed transform block associated with a TU. By reconstructing transform blocks for each TU of a CU in this way, video encoder 20 may reconstruct the coding blocks of the CU.

Filter unit 214 may perform one or more deblocking operations to reduce blocking artifacts in the coding blocks associated with a CU. Decoded picture buffer 216 may store the reconstructed coding blocks after filter unit 214 performs the one or more deblocking operations on the reconstructed coding blocks. Inter-prediction processing unit 220 may use a reference picture that contains the reconstructed coding blocks to perform inter prediction on PUs of other pictures. In addition, intra-prediction processing unit 226 may use reconstructed coding blocks in decoded picture buffer 216 to perform intra prediction on other PUs in the same picture as the CU.

Entropy encoding unit 218 may receive data from other functional components of video encoder 20. For example, entropy encoding unit 218 may receive coefficient blocks from quantization unit 206 and may receive syntax elements from prediction processing unit 200. Entropy encoding unit 218 may perform one or more entropy encoding operations on the data to generate entropy-encoded data. For example, entropy encoding unit 218 may perform a CABAC operation or another type of entropy encoding operation on the data. Video encoder 20 may output a bitstream that includes entropy-encoded data generated by entropy encoding unit 218. For instance, the bitstream may include data that represents values of transform coefficients for a CU.

Figure 3:
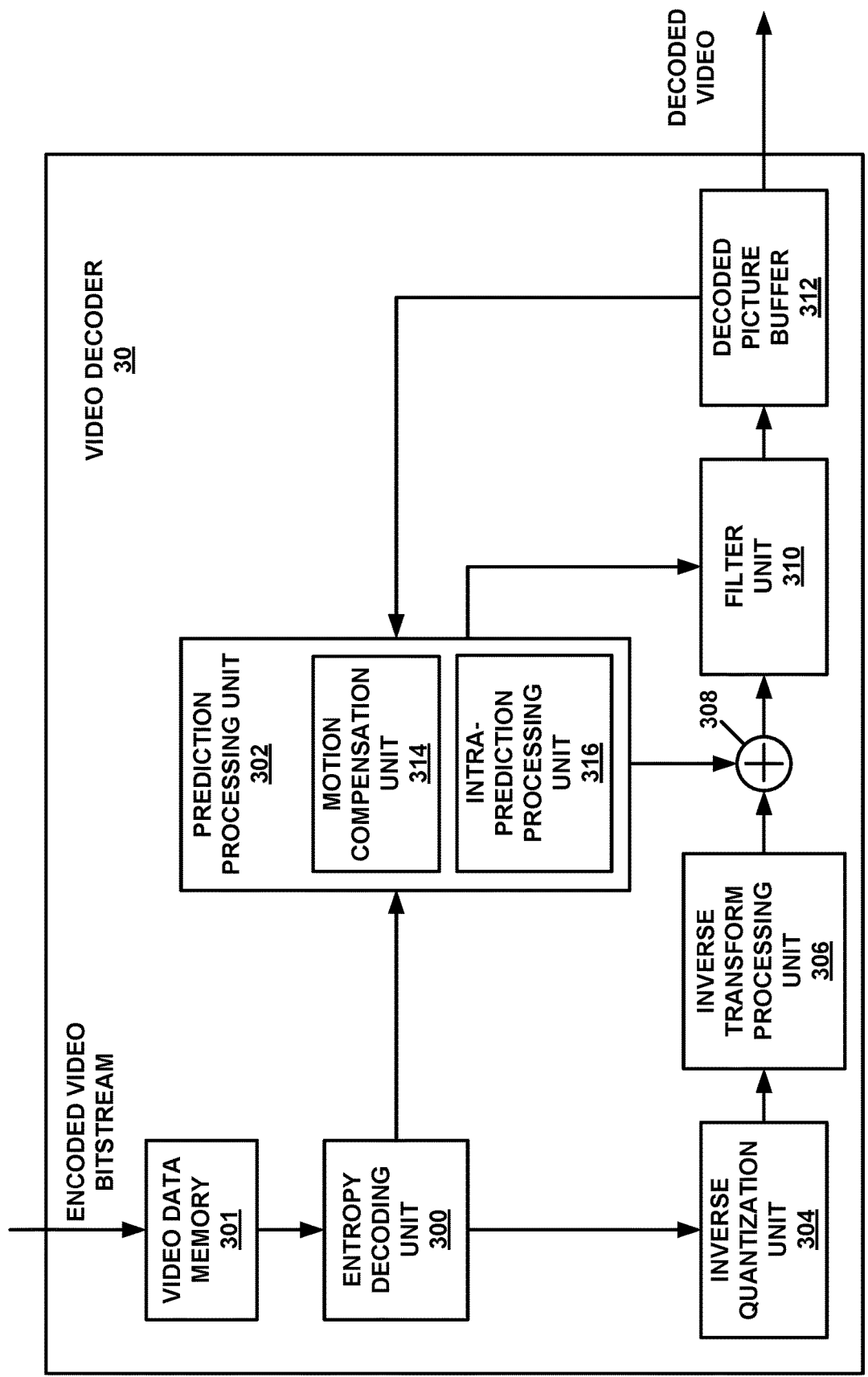
FIG. 3 is a block diagram illustrating an example video decoder that may implement one or more techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 3 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 3 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 3, video decoder 30 includes an entropy decoding unit 300, video data memory 301, a prediction processing unit 302, an inverse quantization unit 304, an inverse transform processing unit 306, a reconstruction unit 308, a filter unit 310, and a decoded picture buffer 312. Prediction processing unit 302 includes a motion compensation unit 314 and an intra-prediction processing unit 316. In other examples, video decoder 30 may include more, fewer, or different functional components.

Video data memory 301 may store encoded video data, such as an encoded video bitstream, to be decoded by the components of video decoder 30. The video data stored in video data memory 301 may be obtained, for example, from computer-readable medium 16, e.g., from a local video source, such as a camera, via wired or wireless network communication of video data, or by accessing physical data storage media. Video data memory 301 may form a coded picture buffer (CPB) that stores encoded video data from an encoded video bitstream. Decoded picture buffer 312 may be a reference picture memory that stores reference video data for use in decoding video data by video decoder 30, e.g., in intra- or inter-coding modes, or for output. Video data memory 301 and decoded picture buffer 312 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 301 and decoded picture buffer 312 may be provided by the same memory device or separate memory devices. In various examples, video data memory 301 may be on-chip with other components of video decoder 30, or off-chip relative to those components. Video data memory 301 may be the same as or part of storage media 28 of FIG. 1.

Video data memory 301 receives and stores encoded video data (e.g., NAL units) of a bitstream. Entropy decoding unit 300 may receive encoded video data (e.g., NAL units) from video data memory 301 and may parse the NAL units to obtain syntax elements. Entropy decoding unit 300 may entropy decode entropy-encoded syntax elements in the NAL units. Prediction processing unit 302, inverse quantization unit 304, inverse transform processing unit 306, reconstruction unit 308, and filter unit 310 may generate decoded video data based on the syntax elements extracted from the bitstream. Entropy decoding unit 300 may perform a process generally reciprocal to that of entropy encoding unit 218.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 304 may inverse quantize, i.e., de-quantize, coefficient blocks associated with the TU. After inverse quantization unit 304 inverse quantizes a coefficient block, inverse transform processing unit 306 may apply one or more inverse transforms to the coefficient block in order to generate a residual block associated with the TU. For example, inverse transform processing unit 306 may apply an inverse DCT, an inverse integer transform, an inverse Karhunen-Loeve transform (KLT), an inverse rotational transform, an inverse directional transform, or another inverse transform to the coefficient block.

Inverse quantization unit 304 may perform particular techniques of this disclosure. For example, for at least one respective quantization group of a plurality of quantization groups within a CTB of a CTU of a picture of the video data, inverse quantization unit 304 may derive, based at least in part on local quantization information signaled in the bitstream, a respective quantization parameter for the respective quantization group. Additionally, in this example, inverse quantization unit 304 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 306, reconstruction unit 308, and filter unit 310) may reconstruct, based on inverse quantized transform coefficients of the transform block, a coding block of the CU.

If a PU is encoded using intra prediction, intra-prediction processing unit 316 may perform intra prediction to generate predictive blocks of the PU. Intra-prediction processing unit 316 may use an intra prediction mode to generate the predictive blocks of the PU based on samples spatially-neighboring blocks. Intra-prediction processing unit 316 may determine the intra prediction mode for the PU based on one or more syntax elements obtained from the bitstream.

If a PU is encoded using inter prediction, entropy decoding unit 300 may determine motion information for the PU. Motion compensation unit 314 may determine, based on the motion information of the PU, one or more reference blocks. Motion compensation unit 314 may generate, based on the one or more reference blocks, predictive blocks (e.g., predictive luma, Cb and Cr blocks) for the PU.

Reconstruction unit 308 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 308 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 310 may perform a deblocking operation to reduce blocking artifacts associated with the coding blocks of the CU. Video decoder 30 may store the coding blocks of the CU in decoded picture buffer 312. Decoded picture buffer 312 may provide reference pictures for subsequent motion compensation, intra prediction, and presentation on a display device, such as display device 32 of FIG. 1. For instance, video decoder 30 may perform, based on the blocks in decoded picture buffer 312, intra prediction or inter prediction operations for PUs of other CUs.

Arithmetic coding is a fundamental tool used in data compression. See e.g., I. H. Witten, R. M. Neal, and J. G. Cleary, "Arithmetic coding for data compression," Commun. ACM, vol. 30, no. 6, pp. 520-540, June 1987 (hereinafter, "Reference 1"); A. Said, "Arithmetic Coding," in "Lossless Compression Handbook," K. Sayood, Ed., Academic Press, chapter 5, pp. 101-152, 2003 (hereinafter, "Reference 2"); and A. Said, "Introduction to arithmetic coding—theory and practice," Hewlett Packard Laboratories, Palo Alto, Calif., USA, Technical Report HPL-2004-76, April 2004, (http://www.hpl.hp.com/techreports/2004/HPL-2004-76.pdf) (hereinafter, "Reference 3").

Arithmetic coding was optional in the AVC/H.264 video compression standard. See I. D. Marpe, H. Schwarz, and T. Wiegand, "Context-based adaptive binary arithmetic coding in the H.264/AVC video compression standard," IEEE Trans. Circuits Syst. Video Technol., vol. 13, no. 7, pp. 620-636, July 2003 (hereinafter, "Reference 4"); I. E. Richardson, The H.264 Advanced Video Compression Standard, 2nd ed., John Wiley and Sons Ltd., 2010 (hereinafter, "Reference 5").

Arithmetic coding became the only entropy coding technique of video coding standards HEVC/H.265 and VP9. See V. Sze and M. Budagavi, "High throughput CABAC entropy coding in HEVC," IEEE Trans. Circuits Syst. Video Technol., vol. 22, no. 12, pp. 1778-1791, December 2012 (hereinafter, "Reference 6"); V. Sze and D. Marpe, "Entropy coding in HEVC," in High Efficiency Video Coding (HEVC): Algorithms and Architectures, V. Sze, M. Budagavi, and G. J. Sullivan, Eds., chapter 8, pp. 209-274. Springer, 2014 (hereinafter, "Reference 7"); M. Wien, High Efficiency Video Coding: Coding Tools and Specification, Springer-Verlag, 2015 (hereinafter, "Reference 8"); D. Mukherjee, J. Bankoski, R. S. Bultje, A. Grange, J. Han, J. Koleszar, P. Wilkins, and Y. Xu, "The latest open-source video codec VP9—an overview and preliminary results," in Proc. 30th Picture Coding Symp., San Jose, Calif., December 2013 (hereinafter, "Reference 9").

Due to the superior compression efficiency of arithmetic coding, arithmetic coding is expected to remain the only entropy coding technique used in future video coding standards. However, one of the main problems of using entropy coding in practical applications is that the most effective methods are designed to be optimal for stationary data sources, but real data from complex signals (like video) are far from stationary. Current solutions use data classification and adaptive coding methods to address this problem, and techniques of this disclosure may increase the efficiency of adaptation techniques.

Techniques of this disclosure may improve compression efficiency by exploiting the fact that, even when the data is finely divided in many classes (coding contexts), there is still much variability in the statistics of the data assigned for each class. So, instead of using a single "universal" adaptation technique for all classes, this disclosure proposes changing adaptation parameters according to each class, and within each class, further changing the adaptation parameters according to expected or observed probability values, or measured variations in the estimates.

In addition, this disclosure describes example techniques to improve binary probability estimation, which is the adaption for binary arithmetic coding. The example techniques may enable better compression by using discrete-time signal analysis to improve methods to estimate probability using recursive equations, and special features that enable low complexity and stability when using low-precision implementations.

As described in References 1, 2, and 3, modern video coding standards adopt the strategy of decomposing entropy coding into modeling and actual coding. Thus, the binary arithmetic coding process used in modern video compression standards is divided into three main stages. Video encoder 20 may perform the operations of these stages, and video decoder 30 may perform inverse operations of these stages.

(a) Binarization: each data element (or syntax element) to be coded is first decomposed into a sequence of binary data symbols (bins). Because binary symbol probabilities depend on the data element and binary symbol position in its decomposition, a bin context (or simply context) is assigned for each type of binary symbol, uniquely identifying the probability estimate to be used for its entropy coding.

(b) Adaptive probability estimation: since it is assumed that all bins assigned to a given context have similar, but not exactly equal probabilities, the encoder and decoder update their probability estimates based on the bin values that have been previously encoded or decoded.

(c) Arithmetic coding: the value of each binary symbol (0 or 1) is entropy coded using the estimated probability of its value, which is defined by the bin's corresponding context.

The techniques of this disclosure may obtain better compression by improving the adaptive probability estimation.

Example techniques used in practice for binary probability estimation are presented in the following references:

F. T. Leighton and R. L. Rivest, "Estimating a probability using finite memory," IEEE Trans. Inf. Theory, vol. 32, no. 6, pp. 733-742, November 1986 (hereinafter, "Reference 10").

W. B. Pennebaker and J. L. Mitchell, "Probability estimation for the Q-Coder," IBM J. Res. Develop., vol. 32, no. 6, pp. 737-752, November 1988 (hereinafter, "Reference 11").

P. G. Howard and J. S. Vitter, "Practical implementations of arithmetic coding," in Image and Text Compression, J. A. Storer, Ed., chapter 4, pp. 85-112. Kluwer Academic Publishers, Norwell, Mass., 1992 (hereinafter, "Reference 12").

E. Meron and M. Feder, "Finite-memory universal prediction of individual sequences," IEEE Trans. Inf. Theory, vol. 50, no. 7, pp. 1506-1523, July 2004 (hereinafter, "Reference 13").

E. Belyaev, M. Gilmutdinov, and A. Turlikov, "Binary arithmetic coding system with adaptive probability estimation by 'virtual sliding window'," in Proc. IEEE Int. Symp. Consumer Electronics, St. Petersburg, Russia, June 2006 (hereinafter, "Reference 14").

A. Alshin, E. Alshina, and J.-H. Park, "High precision probability estimation for CABAC," in *Proc. IEEE Visual Commun. Image Process. Conf.*, Kuching, Malaysia, November 2013 (hereinafter, "Reference 15").

A. V. Oppenheim and R. W. Schafer, Discrete-Time Signal Processing, Prentice-Hall, Inc., Upper Saddle River, N.J., 3rd ed., August 2009 (hereinafter, "Reference 16").

S. K. Mitra, Digital Signal Processing: A Computer-based Approach, McGraw-Hill Publishing Co., New York, N.Y., 4th ed., 2010 (hereinafter, "Reference 17").

To achieve very low computational complexity practical requirements, the probability estimation is commonly done using some type of finite-state-machine (FSM). For ease of explanation of the techniques of this disclosure, this disclosure does not cover details about the implementation of the FSMs of References 10-14, but it is useful to define a proper terminology, and some examples are presented at the end of this section.

Figure 4:
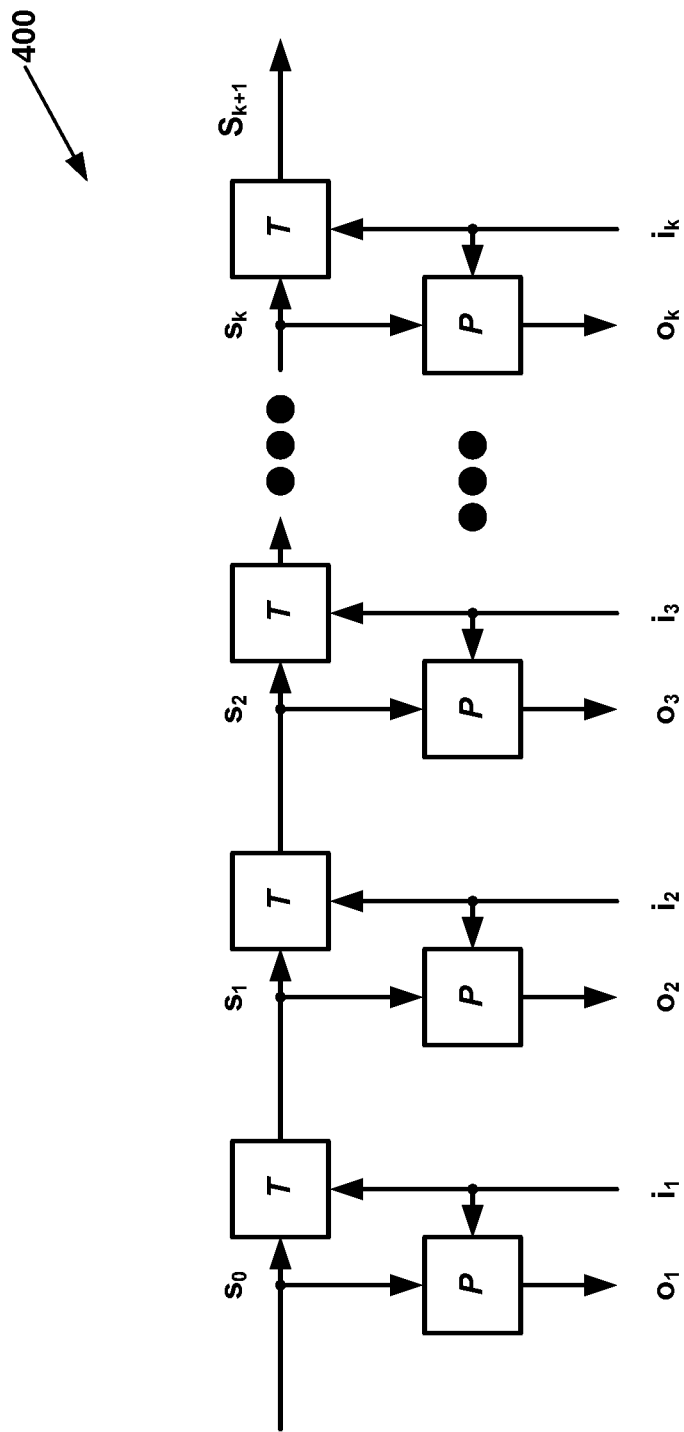
FIG. 4 is a block diagram of an example general finite state machine.

FIG. 4 is a block diagram of an example general FSM 400. More specifically, FIG. 4 is a graphical representation of sequence of state transitions, inputs, and outputs of a general finite state machine. In FIG. 4, the sequences $\{s_n\}$, $\{i_n\}$, $\{o_n\}$ represent, respectively, the states, inputs, and outputs of FSM 400, which are vectors with integer elements (the vector dimensions and their sets of allowed element values have to be well defined, but are not important for this discussion).

Following the definitions above, the arrows in the diagram of FIG. 4 represent a state updating equation and an output equation, which are $$s_n = T(i_n, s_{n-1}), \quad o_n = P(i_n, s_{n-1}), \qquad (1)$$

where T is the state updating function, and P is the output function.

In probability estimation FSMs, the inputs are bin values, and the outputs are bin probability estimates. The use of FSMs during entropy encoding and decoding is shown in FIG. 5, FIG. 6, FIG. 7, and FIG. 8, where, by convention, the binary probability estimation FSM is called a coding context.

Figure 5:
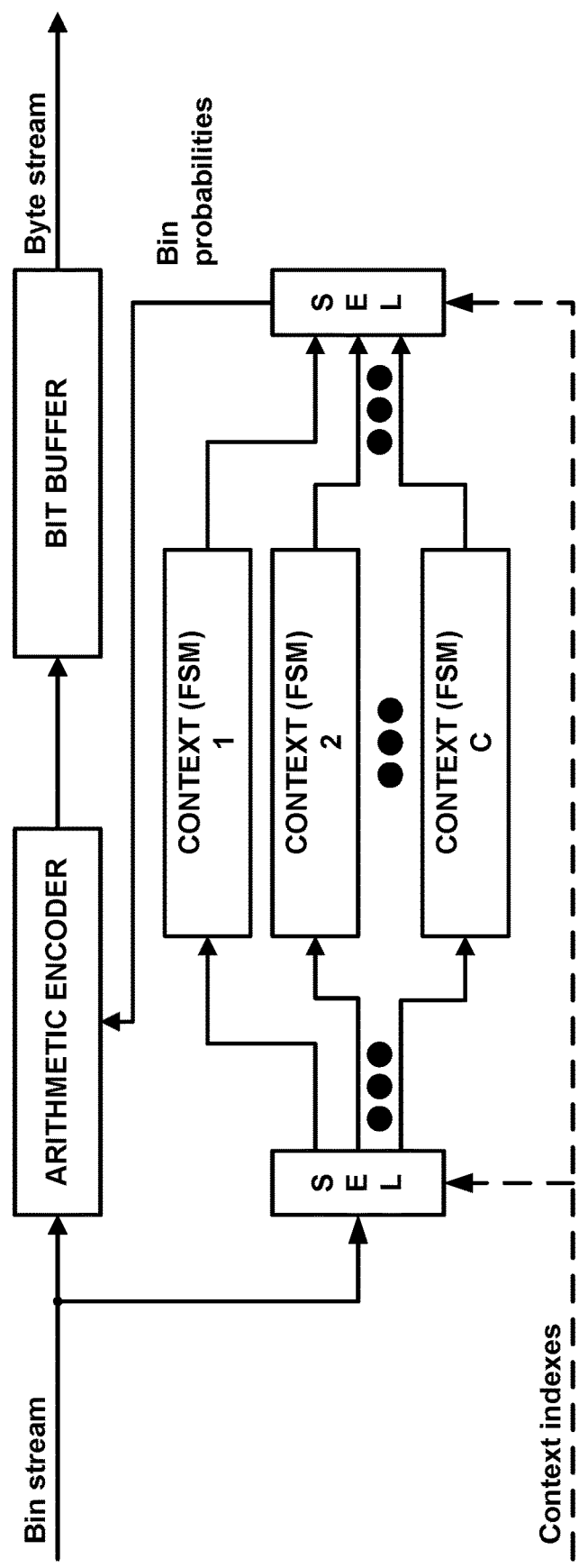
FIG. 5 is an example block diagram for context-based binary arithmetic encoding using many finite state machines (FSMs) for bin probability estimation.
Figure 6:
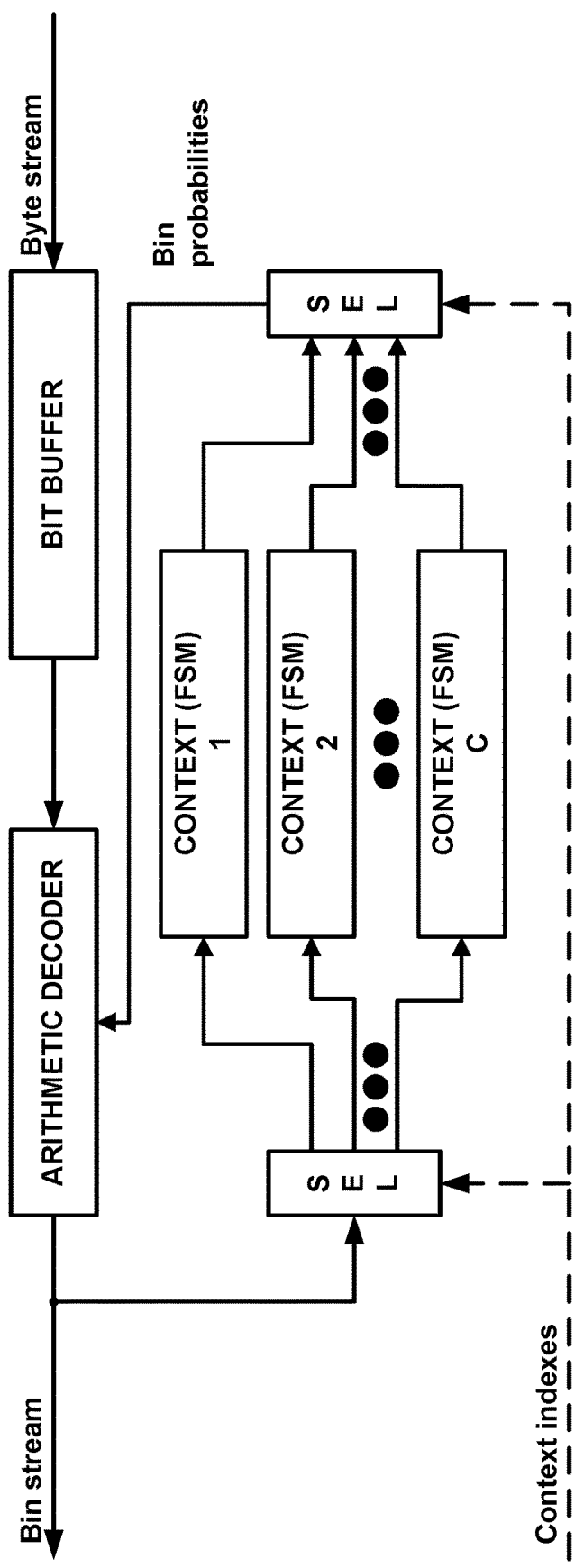
FIG. 6 is an example block diagram for context-based binary arithmetic decoding using many FSMs for bin probability estimation.

As shown in the example of FIG. 5 and FIG. 6, in practical video coding, the entropy coding stage may be implemented by using a large number of coding contexts. The coding contexts are selected during encoding and decoding depending on the type (or class) of the bin being encoded or decoded.

Figure 7:
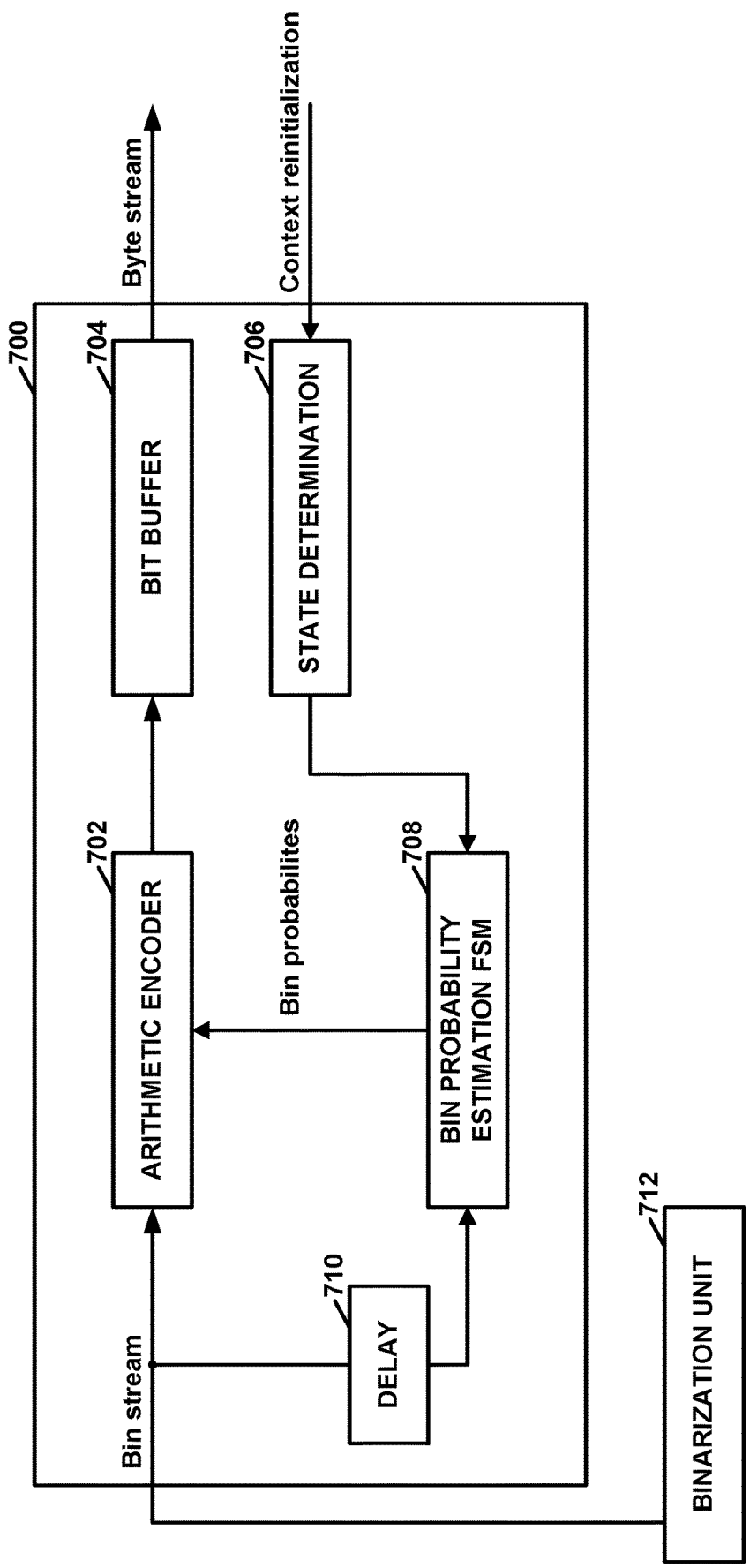
FIG. 7 is an example block diagram for context-based binary arithmetic encoding considering a single selected context.

FIG. 7 is an example block diagram for context-based binary arithmetic encoding considering a single selected context. In FIG. 7, an arithmetic encoding unit 700 includes an arithmetic encoder 702, a bit buffer 704, a state determination unit 706, and a probability estimation FSM unit 708. Arithmetic encoding unit 700 may, in some examples, receive a bin stream from a binarization unit 712. Arithmetic encoding unit 700 and binarization unit 712 may form part of entropy encoding unit 218 of FIG. 2. Binarization unit 712 encodes each data element (e.g., syntax element) into a sequence of binary data symbols (bins). The sequence of binary data symbols may be referred to as a "bin stream." Additionally, arithmetic encoding unit 700 may receive a context reinitialization signal. For instance, arithmetic encoding unit 700 may receive a context reinitialization signal when arithmetic encoding unit 700 starts encoding a different type of binary symbol.

Furthermore, in FIG. 7, in response to receiving a context reinitialization signal, state determination unit 706 may reinitialize a state of a probability estimation FSM. In general, reinitialization refers to resetting the probability estimates to the initial probability estimates associated with a coding context. For example, based on the type of binary symbol to be encoded, state determination unit 706 may look up initial probability estimates in a predefined table. The predefined table may be defined by a video coding standard, such as HEVC. State determination unit 706 may provide the determined initial probability estimates to bin probability estimation FSM unit 708. For the first bin of the bin stream, bin probability estimation FSM unit 708 provides the initial probability estimates to arithmetic encoder 702. Additionally, bin probability estimation FSM unit 708 updates the probability estimates based on the actual value of the first bin of the bin stream. For each subsequent bin until state determination unit 706 resets the probability estimates, bin probability estimation FSM unit 708 updates the probability estimates according to a state updating function, e.g., as shown in equation (1).

For each bin of the bin stream, arithmetic encoder 702 may use the probability estimates provided by bin probability estimation FSM unit 708 to encode the bin as described elsewhere in this disclosure with respect to CABAC. Bit buffer 704 may store the bins encoded by arithmetic encoder 702. In FIG. 7, delay box 710 signifies that the bin probabilities generated by bin probability estimation FSM unit 708 are based on a bin previous to the bin currently being encoded by arithmetic encoder 702.

Figure 8:
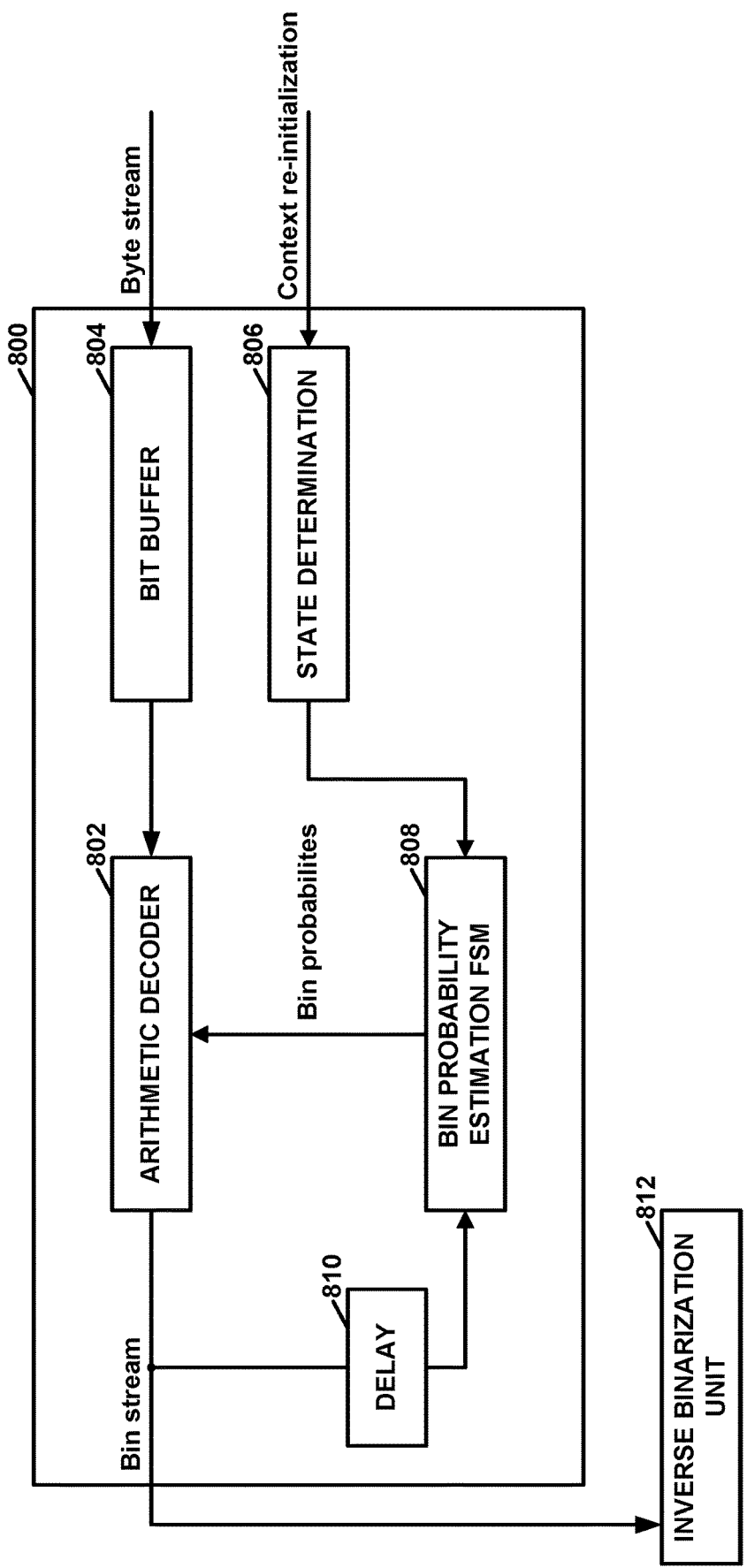
FIG. 8 is an example block diagram for context-based binary arithmetic decoding considering a single selected context.

FIG. 8 is an example block diagram for context-based binary arithmetic decoding considering a single selected context. In FIG. 8, an arithmetic decoding unit 800 includes an arithmetic decoder 802, a bit buffer 804, a state determination unit 806, and a probability estimation FSM unit 808. Arithmetic decoding unit 800 generates a bin stream that may, in some examples, be received by an inverse binarization unit 812. Arithmetic decoding unit 800 and inverse binarization unit 812 may form part of entropy decoding unit 300 of FIG. 3. Inverse binarization unit 812 converts the bin stream into a series of one or more syntax elements.

In FIG. 8, arithmetic decoding unit 800 receives a byte stream, which may be parsed from a bitstream received by video decoder 30. Additionally, arithmetic decoding unit 800 may receive a context reinitialization signal. For instance, arithmetic decoding unit 800 may receive a context reinitialization signal when arithmetic decoding unit 800 starts encoding a different type of binary symbol. Furthermore, in FIG. 8, in response to receiving a context reinitialization signal, state determination unit 806 may reinitialize a state of a probability estimation FSM. For example, based on the type of binary symbol to be encoded, state determination unit 806 may look up initial probability estimates in a predefined table. The predefined table may be defined by a video coding standard, such as HEVC. The predefined table may be the same as the table used by state determination unit 706 (FIG. 7). State determination unit 806 may provide the determined initial probability estimates to bin probability estimation FSM unit 808. For the first bin of the bin stream, bin probability estimation FSM unit 808 provides the initial probability estimates to arithmetic decoder 802. Additionally, bin probability estimation FSM unit 808 updates the probability estimates based on the actual value of the first bin of the bin stream. For each subsequent bin until state determination unit 806 resets the probability estimates, bin probability estimation FSM unit 808 updates the probability estimates according to a state updating function, e.g., as shown in equation (1).

For each bin of the bin stream, arithmetic decoder 802 may use the probability estimates provided by bin probability estimation FSM unit 808 to decode the bin as described elsewhere in this disclosure with respect to CABAC. Bit buffer 804 may store the bins to be decoded by arithmetic decoder 802. In FIG. 8, delay box 810 signifies that the bin probabilities generated by bin probability estimation FSM unit 808 are based on a bin previous to the bin currently being decoded by arithmetic decoder 802.

FIG. 7 and FIG. 8 show simplified diagrams, considering the exemplary case in which a single context has been selected. FIG. 7 and FIG. 8 also show one feature always present in practical application, which is the need to periodically re-synchronize the encoder and decoder states, using a shared table with data that in converted to encoder states. For example, in the HEVC standard, the contexts are periodically re-initialized with a table defining, for each context, how to convert from a compression-quality parameter (known as quantization step, or quantization parameter (QP) value) (see References 7 and 8) to FSM states.

In the HEVC standard, the FSM functions are implemented using only table look-up methods. See References 7 and 8. In the latest draft of the Joint Exploration Model (JEM) produced by the ITU-T/MPEG JVET, the FSM has been implemented using two forms of discrete time infinite impulse response (IIR) filters. The first is in the form (see References 13 and 14):

$$p[k+1] = p[k] + \left\lfloor \frac{2^{15}b[k] - p[k]}{2^a} \right\rfloor,$$

where p[k] is an integer sequence of scaled probability estimates (the FSM states and outputs), b[k] is the binary sequence of bin values (the FSM inputs), and a is a positive integer, enabling the multiplications and divisions to be implemented with bit shifts.

The second form uses a method proposed by A. Alshin, E. Alshina, and J.-H. Park, "High precision probability estimation for CABAC," in Proc. IEEE Visual Commun. Image Process. Conf., Kuching, Malaysia, November 2013 (hereinafter, "Reference 15"), and is defined by the following equations:

$$q_1[k+1] = q_1[k] + \left\lfloor \frac{2^{15}b[k] - q_1[k]}{2^4} \right\rfloor, \quad (2)$$

$$q_2[k+1] = q_2[k] + \left\lfloor \frac{2^{15}b[k] - q_2[k]}{2^8} \right\rfloor,$$

$$p[k+1] = \left\lfloor \frac{q_1[k+1] + q_2[k+1]}{2} \right\rfloor.$$

Note that in this case, the probability estimation FSM inputs and outputs are still sequences b[k] and p[k], respectively, but the state is defined by pairs ($q_1$ [k], $q_2$ [k]). The estimation here can also be named "two-track estimation" since both $q_1$ [k], $q_2$ [k] are probability estimates, which are updated and stored.

Because entropy coding is designed to be optimal for stationary data sources, its practical effectiveness has depended on classifying data elements, so that the statistics in each class is approximately stationary, and it is possible to use probability estimation FSMs that are nearly "universal," i.e., adapt equally well for all data contexts. As shown in FIG. 7 and FIG. 8, based on that assumption, probability estimation FSMs are not changed, and only their states are re-initialized periodically.

This disclosure addresses the fact that in practice there are no truly "universally optimal" probability estimation FSMs for use in CABAC, because not only do probabilities change for each context, but also the speed and magnitude of changes differ among contexts. This disclosure describes a solution to this problem that exploits the fact that variation occurs according to context or estimated probability, but the best strategy is to exploit both for determining the optimal FSM. Techniques of this disclosure also cover the option of choosing FSM parameters by evaluating the evolution of FSM states, e.g., by measuring the difference between more than one estimation.

In accordance with one or more techniques of this disclosure, the conventional definition of probability estimation FSMs is changed, and the techniques of this disclosure also define a FSM parameter vector h, which can be used to change the FSM responses. With this definition, equation (1) can be rewritten as:

$$s_n = T(i_n, s_{n-1}, h), o_n = P(i_n, s_{n-1}, h), \quad (3)$$

where now T is the parameterized state updating function, and P is the parameterized output function. In other words, the state updating and the output equations may be redefined as shown in equation (3). Such probability estimation FSMs may be referred to herein as "parameterized-context FSMs."

With this definition, two factors can be identified that define coding performance of a parameterized-context FSM:

FSM states ($s_n$): contains the numerical or logical information directly used for computing the probabilities of the binary symbols, and are the only data changed by re-initialization in previous standards;

FSM parameters (h): define state updating, and how probability estimates are computed from the states; the invention improves compression by modifying these parameters during coding or during re-initialization.

For example, the probability estimation in equation (2) can be changed to use positive integers (a, b) as parameters in equations:

$$q_1[k+1] = q_1[k] + \left\lfloor \frac{2^{15}b[k] - q_1[k]}{2^a} \right\rfloor, \quad (4)$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor.$$

Since parameters a and b are used to determine the estimated probability for a next bin (i.e., p[k+1]), the parameters a and b in equation (4) may be considered to be for the next bin. In equation (4), the parameters (a, b) may change the state transitions, but not the output equation. This distinction is used because, even though it is mathematically possible to define the FSM parameters as part of the FSM state, this represents a practical difference.

Figure 9:
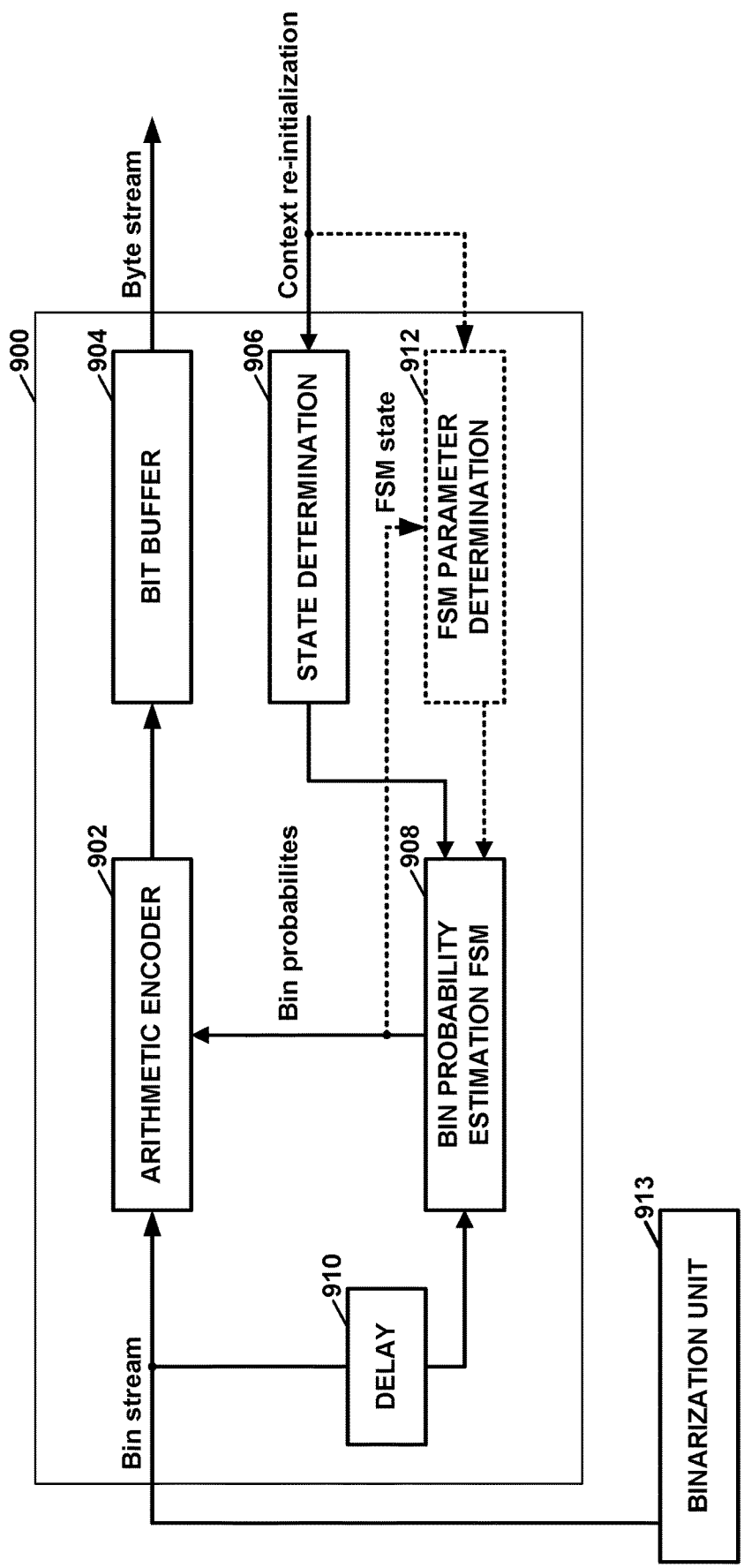
FIG. 9 is an example block diagram for context-based arithmetic encoding, in accordance with one or more aspects of this disclosure.
Figure 10:
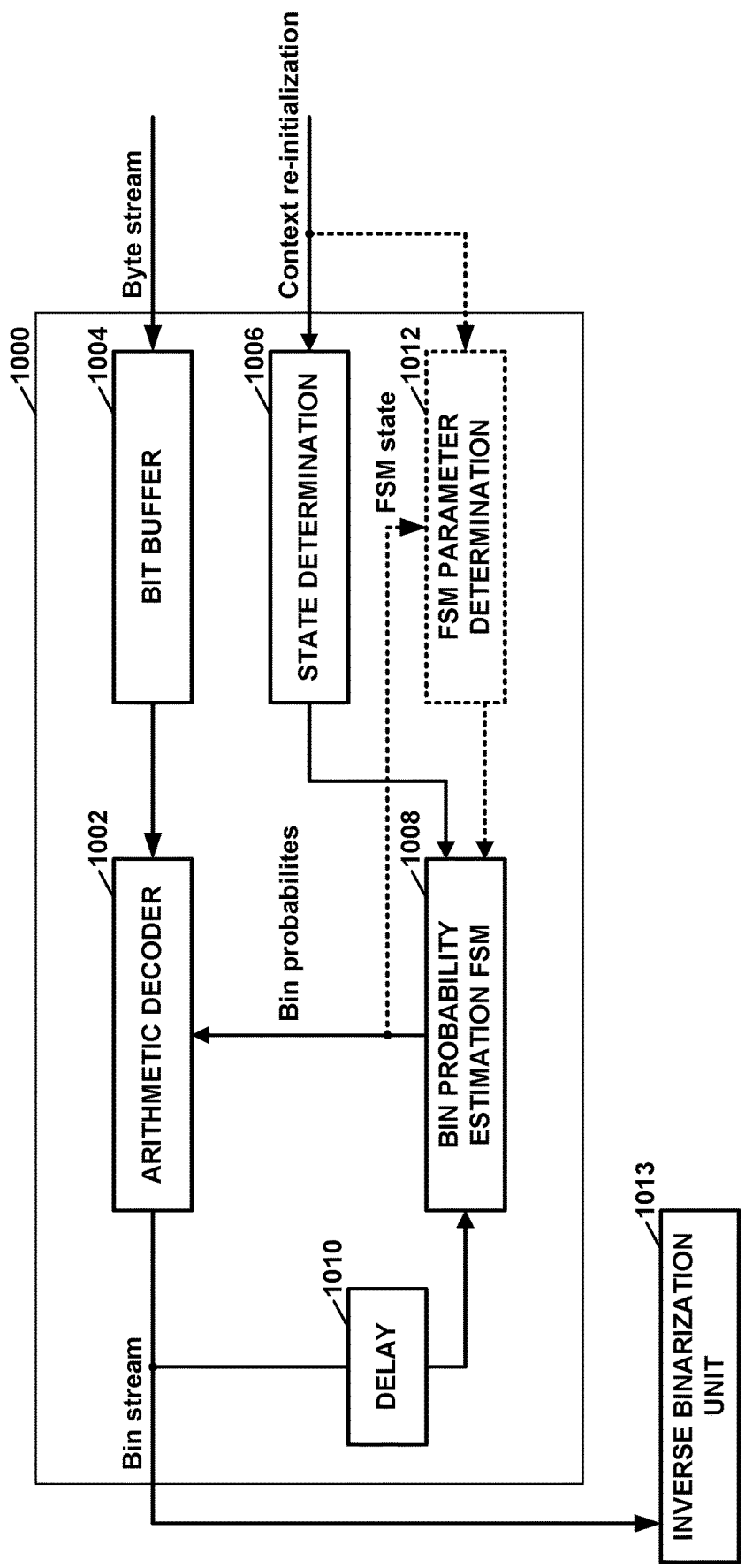
FIG. 10 is an example block diagram for context-based arithmetic decoding, in accordance with one or more aspects of this disclosure.

FIG. 9 and FIG. 10 show how techniques of this disclosure may be integrated in an arithmetic coding process. In the example of FIG. 9, an arithmetic encoding unit 900 includes an arithmetic encoder 902, a bit buffer 904, a state determination unit 906, a probability estimation FSM unit 908, and a FSM parameter determination unit 912. Arithmetic encoding unit 900 may, in some examples, receive a bin stream from a binarization unit 913. Arithmetic encoding unit 900 and binarization unit 913 may form part of entropy encoding unit 218 of FIG. 2. Binarization unit 913, arithmetic encoder 902, bit buffer 904, state determination unit 906, and delay box 910 may operate in the same manner as binarization unit 713, arithmetic encoder 702, bit buffer 704, state determination unit 706, and delay box 710 in FIG. 7.

In the example of FIG. 10, an arithmetic decoding unit 1000 includes an arithmetic decoder 1002, a bit buffer 1004, a state determination unit 1006, a probability estimation FSM unit 1008, and a FSM parameter determination unit 1012. Arithmetic decoding unit 1000 generates a bin stream that may, in some examples, be received by an inverse binarization unit 1013. Arithmetic decoding unit 1000 and inverse binarization unit 1013 may form part of entropy decoding unit 300 of FIG. 3. Inverse binarization unit 1013 converts the bin stream into a series of one or more syntax elements. Binarization unit 1013, arithmetic decoder 1002, bit buffer 1004, state determination unit 1006, and delay box 1010 may operate in the same manner as inverse binarization unit 812, arithmetic decoder 802, bit buffer 804, state determination unit 806, and delay box 810 in FIG. 8.

The main difference (shown in dashed lines in FIG. 9 and FIG. 10) from FIG. 7 and FIG. 8 is the FSM parameter determination units 912, 1012 included in FIG. 9 and FIG. 10. FSM parameter determination units 912, 1012 determine FSM parameters (e.g., a and b in equation (4)). FSM parameter determination unit 912, 1012 may determine the FSM parameters during coding, in response to context reinitialization events, or in other situations. Thus, in FIG. 9 and FIG. 10, parameterized-context FSMs can be modified during coding or re-initialization, by the FSM parameter determination unit 912, 1012, using probability values, quality factors, and other data. Note that the data fed to FSM parameter determination units 912, 1012 can comprise or consist of re-initialization parameters, and also current states (e.g., bin probabilities).

Thus, in accordance with one or more techniques of this disclosure, video encoder 20 may receive video data. The video data may comprise one or more pictures. Furthermore, prediction processing unit 200, quantization unit 206, and potentially other components of video encoder 20 may generate syntax elements based on the video data. In this example, entropy encoding unit 218 may determine an offset value by applying binary arithmetic encoding to one of the generated syntax elements. As part of applying the binary arithmetic encoding, entropy encoding unit 218 may generate a bin stream by binarizing one or more syntax elements. Furthermore, for at least one respective bin of the bin stream (e.g., a particular bin of the bin stream, each bin of the bin stream, each bin of the bin stream other than a last bin of the bin stream, etc.), entropy encoding unit 218 may determine, based on a state for the respective bin, an interval for the respective bin, and a value of the respective bin, an interval for a next bin of the bin stream. Additionally, entropy encoding unit 218 may determine one or more FSM parameters for the next bin of the bin stream. Entropy encoding unit 218 may also determine, based on the state for the respective bin, the one or more FSM parameters for the next bin of the bin stream, and the value of the respective bin, a state for the next bin of the bin stream. In this example, the offset value may be equal to a value in the interval for a last bin of the bin stream. Video encoder 20 may output a bitstream comprising the offset value.

Furthermore, in accordance with one or more techniques of this disclosure, entropy decoding unit 300 of video decoder 30 may determine a decoded syntax element by applying binary arithmetic decoding to an offset value included in a bitstream. As part of applying the binary arithmetic decoding, entropy decoding unit 300 may generating a bin stream. As part of generating the bin stream, entropy decoding unit 300 may, for at least one respective bin of the bin stream (e.g., a particular bin of the bin stream, each bin of the bin stream, each bin of the bin stream other than a last bin of the bin stream, etc.) determine, based on a state for the respective bin, an interval for the respective bin, and the offset value, a value of the respective bin. Additionally, entropy decoding unit 300 may determine one or more FSM parameters for a next bin of the bin stream. The next bin of the bin stream follows the respective bin in the bin stream. Furthermore, entropy decoding unit 300 may determine, based on the state for the respective bin, the one or more FSM parameters for the next bin of the bin stream, and the value of the respective bin, a state for the next bin of the bin stream. Entropy decoding unit 300 may debinarize the bin stream to form the decoded syntax element. Other components of video decoder 30 may reconstruct a picture of the video data based in part on the decoded syntax element. In other words, video decoder 30 may use the decoded syntax element in a process to reconstruct the picture.

In some examples, FSM parameter determination units 912, 1012 use different functions for different contexts. For instance, each context may use a different function in FSM parameter determination units 912, 1012. FSM parameter determination units 912, 1012 use the function for a context to determine the FSM parameters used by bin probability estimation FSM units 908, 1008. For instance, each of FSM parameter determination units 912, 1012 may access a predefined table that maps different contexts to different FSM parameters. In another example, different contexts may be associated with different predefined tables. In this example, each of FSM parameter determination units 912, 1012 may access the predefined table associated with a current context and look up an entry in the predefined table associated with the current context based on one or more additional pieces of information. In this example, the additional pieces of information may include information regarding coding modes of neighboring blocks, information regarding a position of a last non-zero coefficient, and so on. In some examples, the function for a context is a mapping from the context to predetermined values of the FSM parameters. Thus, in some examples, each of FSM parameter determination units 912, 1012 is configured with a table that maps contexts to predetermined values of the FSM parameters.

In some examples, even for the same context, the FSM parameters (e.g., (a, b) for the two-track arithmetic coder) may also be dependent on slice types and/or quantization parameters, and/or coded mode information (e.g., any type of information that is coded as side information to the decoder, for example, in a slice header). For example, each of FSM parameter determination units 912, 1012 may be configured with a table that maps combinations of factors (e.g., context, slice types, quantization parameters, coded mode information, etc.) to FSM parameters.

FSM parameter determination units 912, 1012 may modify FSM parameters in various ways. In other words, FSM parameter determination units 912, 1012 may change which FSM parameters are used by bin probability estimation FSM unit 908 in response to various events and based on various types of information. Some possibilities are listed below, which may be applicable for each context.

In one example, FSM parameters are modified during re-initialization according to a state re-initialization parameter, such as a quantization step or QP value. For example, a video coder may be configured with a predefined table that maps values of the state reinitialization parameter to FSM parameters. In this example, the video coder may use the table to look up FSM parameters based on the state reinitialization parameters.

In some examples, FSM parameters are modified according to estimated probability values, during re-initialization, or at periodic intervals shorter than re-initialization (e.g., for each CTU, after each bin, etc.). For example, a video coder may be configured with a predefined table that maps estimated probability values to FSM parameters. In this example, the video coder may use the table to look up FSM parameters based on the estimated probability values. In this example, the video coder may use the table to look up the FSM parameters during context reinitialization. For instance, the video coder may use the probability estimates specified by a coding context to look up FSM parameters during context reinitialization. Furthermore, in some examples, bin probability estimation FSM units 908 or 1008 may determine probability estimates for bins that follow a first bin after context reinitialization. In such examples, the video coder may use the probability estimates determined by bin probability estimation FSM units 908 or 1008 to look up the FSM parameters in the predefined table.

In some examples, FSM parameters are modified based on a measure of past probability variation. A video coder may compute the measure of past probability variation by summing the absolute differences between probabilities. In different examples, the video coder may estimate the probabilities using different techniques. In one example, using the FSM defined by equation (4), a video coder may use an "estimation variation measure" for determining FSM parameters. In this example, the "estimation variation measure" may be defined according to the following equation:

$$\sigma[k+1] = \sigma[k] + \left\lfloor \frac{|q_1[k] - q_2[k]| - \sigma[k]}{2^c} \right\rfloor, \quad (5)$$

Figure 11A:
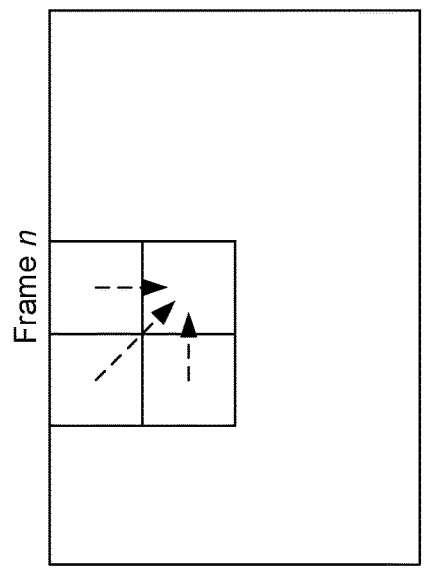
FIG. 11A is a block diagram showing that FSM parameters can be derived from neighboring blocks (e.g., CTUs, CUs) in the same picture following a scan order.
Figure 11A:
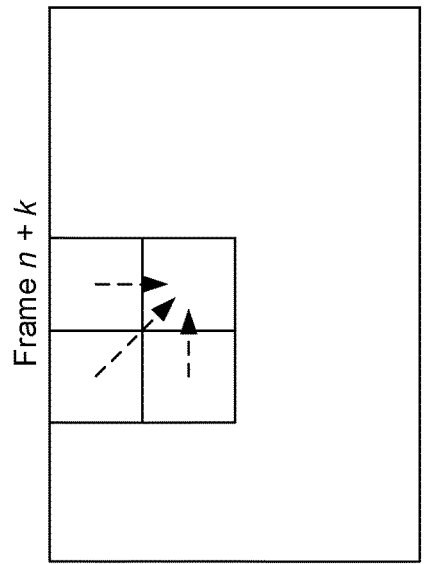

In the equation above, σ[k+1] is the estimation variation measure for bin k+1, σ[k] is the estimation variation measure for bin k, $q_1[k]$ and $q_2[k]$ are defined in equation (4), and c is a parameter (e.g., c may be a constant). In this example, the video coder may access a predefined table that maps different values of the estimation variation measure σ[k] to different sets of FSM parameters. Thus, in this example, the video coder may use the table to look up the FSM parameters based on the estimation variation measure. In some examples, the video coder may access different predefined tables for different coding contexts. In such examples, different entries in the predefined table for a coding context may map different values of σ[k] to values of the FSM parameters. In some examples where the video coder accesses different predefined tables for different coding contexts, different entries in the table for a coding context may map different combinations of values of σ[k] and additional information to values of FSM parameters. In such examples, the additional information may include slice types, quantization parameters, and so on, In some examples, a video coder may use any of the techniques as defined above for modifying the FSM parameters, but instead of using data generated since a previous re-initialization, a video coder may use data from other parts of a video sequence. For example, FIG. 11A is a block diagram showing that FSM parameters can be derived from neighboring blocks (e.g., CTUs, CUs) in the same picture following a scan order. For instance, in the example of FIG. 11A, FSM parameter determination units 912, 1012 may determine FSM parameters based at least in part on information from one or more neighboring blocks. The information may include prediction modes, quantization parameters, and so on. In some examples, the information may include data derived from some measure of the probability variability. For example, a single bit can be used, with 1 to represent that significant changes in probability estimates were observed, and 0 to indicate otherwise.

Figure 11B:
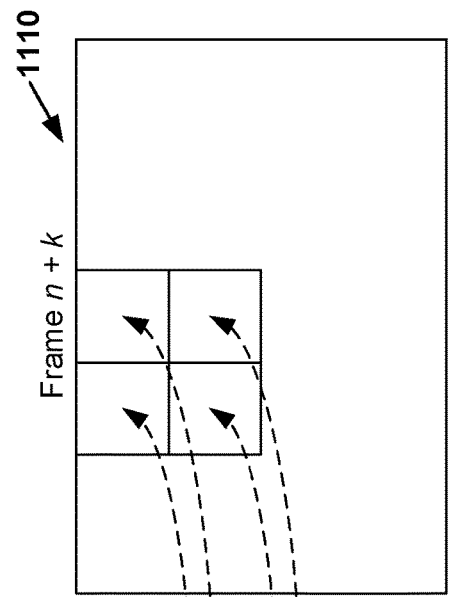
FIG. 11B is a block diagram showing that FSM parameters used in blocks of a current picture can be determined based on information associated with blocks in a previously coded picture.
Figure 11B:
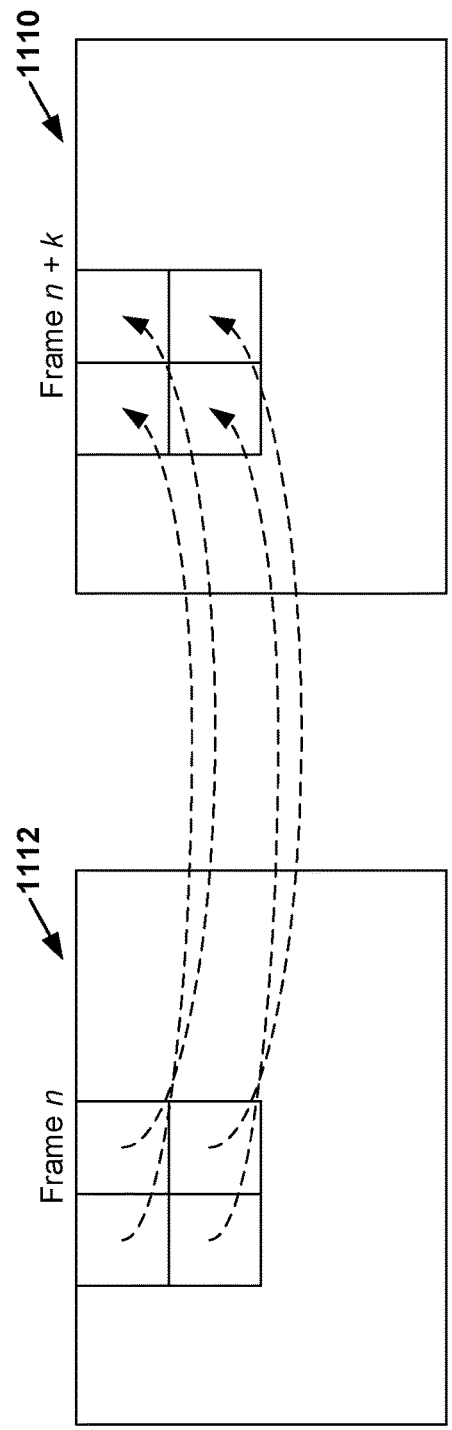

FIG. 11B is a block diagram showing that FSM parameters used in blocks of a current picture 1110 can be determined based on information associated with blocks in a previously coded picture 1112. The blocks in previously coded picture 1112 may have the same spatial location as the blocks in current picture 1110. For instance, in the example of FIG. 11B, FSM parameter determination units 912, 1012 may determine FSM parameters based at least in part on information from one or more blocks in a previously coded picture. The information may include prediction modes, quantization parameters, and so on. In some examples, the information may include data derived from some measure of the probability variability. For example, a single bit can be used, with 1 to represent that significant changes in probability estimates were observed, and 0 to indicate otherwise.

Binary probability estimation, i.e., the process of estimating the probability of a random binary data source, may be related to the well-known Bernoulli (or binomial) trials, and thus has been studied for many decades. However, its use for entropy coding is still under development because, in practical applications, the estimation method has to take into account two conflicting objectives: (1) Compression efficiency improves with higher accuracy of the probability estimates, and the ability to change estimates quickly while preserving accuracy, which require higher computational complexity, and (2) Since arithmetic coding speed can severely limit the throughput of a compression and decompression system (in Mbits/sec), it is preferable that arithmetic coding be performed with small computational complexity to increase throughput.

Because of the preference in practical video coding systems for low complexity, most methods of probability estimation for binary arithmetic coding have been based on FSM, as described in Reference 10, since the first practical implementations of arithmetic coding, as described in Reference 11. The notation of the basics of these techniques is defined below, which may be used in video coding applications.

Assuming there is a sequence of N symbols, $\{b[k]\}_{k=1}^{N}$, from a binary random data source (i.e., $b[k] \in \{0,1\}$), an unknown sequence $\{p_t[k]\}_{k=1}^{N}$ of true probabilities for symbol 1, i.e. $p_t[k]=\text{Prob}(b[k]=1)$, binary probability estimation is the problem of finding a sequence of estimated probabilities $\{p[k]\}_{k=1}^{N}$ that best approximates the true probabilities, under the causality condition, i.e., p[n] can only depend on the set of "past" bins $\{b[k]\}_{k=1}^{n-1}$.

In coding applications, the variables and equations are modified to use only integer arithmetic. Commonly, the probability is scaled by a power of 2. For instance, if an integer scaling factor $2^c$ is used, and capital letters are used to indicate the corresponding integer values, then the scaled values of probabilities and bins may be:

$$p[k] \in (0,1) \Rightarrow P[k] = \lfloor 2^c p[k] + \frac{1}{2} \rfloor \in \{1, 2, \ldots, 2^c - 1\}$$

$$b[k] \in \{0,1\} \Rightarrow B[k] = 2^c b[k] \in \{0, 2^c\}$$

One particular type of probability estimation FSM, that has been adopted, and has been "rediscovered" and renamed several times in the past decades, has an adaptation parameter 0<α<1, and the recursive form:

$$p[k+1] = \alpha b[k] + (1-\alpha)p[k], \quad (6)$$

In a practical encoding application, both the video encoder 20 and the video decoder 30 start with the same initial probability estimate p[1] (commonly from a shared fixed table), and then each bin b[k] is sequentially optimally encoded and decoded using probability estimated p[k], with each probability estimate being updated with equation (6) after each bin is encoded or decoded. Since this is a recursive equation, each probability values depends on all the previously encoded bins or decoded bins.

Signal processing as described in References 16 and 17 shows that, when eq. (6) is used, the estimated probability values dependent on previously coded bins, using exponentially decreasing weights. For that reason, this probability estimation technique was called exponential aging in Reference 12, which suggested using a value of α=0.04 in practical coding applications. The CABAC arithmetic coding method, adopted in the AVC/H.264 and HEVC/H.265 video coding standards, also uses this approach, using a value α=0.0508 [4, 6, 7], and one of the differences from previous implementations is related to its use of a finite-state-machine based on table look-up.

More recently, the same approach has been called exponentially decaying memory in Reference 13 and Reference 14. Reference 14 call it a "virtual sliding window" technique, since the equivalent form $$p[k+1] = \frac{b[k]}{W} + \left(1 - \frac{1}{W}\right)p[k], \quad (7)$$

is related to a randomized algorithm for probability estimation, using a "sliding window" of W bins. Furthermore, References 13 and 14 demonstrate that it can be efficiently implemented with integer arithmetic when W is a power of two, in the form $$p[k+1] = p[k] + \frac{b[k] - p[k]}{2^s}, \quad (8)$$

since the high-complexity division can be replaced by efficient integer bit shifts.

One practical problem with the preceding estimation formulas is that different window values W may be needed, according to the binary data of a given context. If the probabilities of bin values change slowly, or the bin value probabilities are very different (for example, Prob(b[k]=1) >>Prob(b[k]=0)), then more compression is obtained by larger values of W, because they average over a larger number of previous bin values. On the other hand, small values of W may be beneficial when the probabilities change rapidly and frequently.

One solution to this problem, described in Reference 15, is to define a number M of adaptation parameters $\{\alpha_i\}_{i=1}^M$, and weights $\{\gamma_i\}_{i=n}^M$, such that $$\Sigma_{i=1}^M \gamma_i = 1, \ 0 < \alpha_i < 1, \ i=1,2,\ldots,M, \quad (9)$$

use several probability estimators, in the same recursive form of equation (6), $$q_i[k+1] = \alpha_i b[k] + (1 - \alpha_i) q_i[k], \ i=1,2,\ldots,M, \quad (10)$$

and then compute the final estimate as the weighted average:

$$p[k] = \sum_{i=1}^{M} \gamma_i q_i[k].$$

This approach proved to be more efficient in video coding applications, and for that reason the current ITU/MPEG experimental video compression program uses the following three equations (using integer arithmetic) for probability estimation.

$$Q_1[k+1] = Q_1[k] + \left\lfloor \frac{B[k] - Q_1[k]}{2^4} \right\rfloor, \quad (11)$$

-continued $$Q_2[k+1] = Q_2[k] + \left\lfloor \frac{B[k] - Q_2[k]}{2^8} \right\rfloor,$$

$$P[k+1] = \left\lfloor \frac{Q_1[k+1] + Q_2[k+1]}{2} \right\rfloor.$$

In this case, the probability estimation FSM uses $Q_1$ and $Q_2$ as state elements, which makes it difficult to use the common technique of estimating only the probability of the least-probable-symbol (LPS), since $Q_1 > \frac{1}{2}$ and $Q_2 < \frac{1}{2}$ can occur simultaneously, or vice versa.

Using discrete-time signal processing described in References 16 and 17, and the definition of the z-transform, the result is:

$$P(z) = \Sigma_n p[k] z^{-n}, \ B(z) = \Sigma_n b[k] z^{-n}, \ z \in \mathbb{C} \quad (12)$$

Following convention, this disclosure uses capital letters for z-transforms, but they can be recognized by the use parentheses instead of brackets. For example, P[k] is used to represent the scaled integer version of p[k], while P(z) represents the z-transform of p[k].

Figure 12:
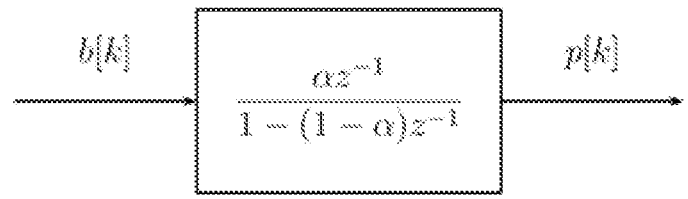
FIG. 12 is a block diagram of an example probability estimation filter.

Using these definitions, equation (6) corresponds to:

$$zP(z) = \alpha B(z) + (1 - \alpha)P(z), \quad (13)$$

or $$P(z) = H(z)B(z) = \left(\frac{\alpha z^{-1}}{1 - (1 - \alpha)z^{-1}}\right)B(z), \quad (14)$$

which means that the probability estimate is the output of an infinite-impulse-response (IIR) filter with response $$H(z) = \frac{\alpha z^{-1}}{1 - (1 - \alpha)z^{-1}} \quad (15)$$

applied to sequence of bin values, as shown in FIG. 12. For instance, FIG. 12 illustrates one example of a probability estimation filter defined by equation (6).

Figure 13:
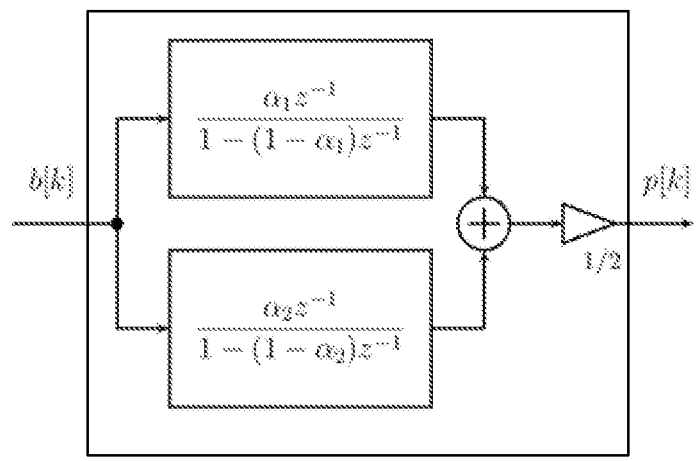
FIG. 13 is a block diagram of another example probability estimation filter.

The probability estimator of equation (10), using two factors, corresponds to the parallel filter implementation shown in FIG. 13. In FIG. 13, the probability estimation filter defined by equation (10) includes two estimators and equal weights.

Thus, in some examples, video encoder 20 may implement the operations of the probability estimation filters illustrated in FIGS. 12 and 13 to determine the bin probability (e.g., p[k]) of a particular bin (e.g., b[k]) used for arithmetic encoding. The b[k] for video encoder 20 may be based on binarized syntax elements or more generally video data that are encoded into the bitstream. Similarly, video decoder 30 may implement the operations of the probability estimation filters illustrated in FIGS. 12 and 13 to determine the bin probability (e.g., p[k]) of a particular bin (e.g., b[k]) used for arithmetic encoding. The b[k] for video decoder 30 may be included in a bitstream from which video data is decoded.

Since entropy coding (e.g., arithmetic coding) is designed to be optimal for stationary data sources (e.g., non-moving content), its practical effectiveness depends on classifying data elements, so that the statistics in each class is approximately stationary. In practice, each class is represented by a coding context (or bin context for binary alphabets), and even though each context should correspond to a different set of symbol probabilities, it is assumed that, if the symbol probabilities change, the way the changes occur should be sufficiently similar, so that a single adaptation method will suffice for all contexts.

However, in reality, in practical video coding, the data in each of the streams created by classification also have distinct high-order variations. For example, classes correspond to the following cases The data is truly stationary;

Symbol probabilities change frequently, but in small amounts;

Symbol probabilities do not change frequently, but when they do change, the probability values change very significantly.

There may also be variability on how frequently the data symbol probabilities change, the speed of change, and the average magnitude of the changes. To deal with all the different cases, it may be desirable to have good control of the estimation process. This disclosure describes how this can be done by increasing the order of the estimation, and adjusting the parameters of the new estimators to optimally match the data source statistics. In addition, the techniques described in this disclosure may address the problem of FSM estimators that do not have the probability estimation as part of its state, which makes it difficult to use the common technique of estimating only the probability of the least-probable-symbol (LPS).

In order to enable more degrees of freedom in the response of the predictors, the techniques may use higher-order filters. An IIR filter response is commonly defined using a polynomial representation, such as:

$$H(z) = \gamma z^{-1} \frac{\sum_{i=1}^{F} \alpha_i z^{-i}}{\sum_{i=1}^{F} \beta_i z^{-i}}. \tag{16}$$

However, in the probability estimation problem, the parameters of the polynomial representation normally do not allow for minimal computational complexity. Also, the best responses are known to be numerically unstable, further complicating the implementation.

This disclosure describes using the following product form as the starting point from which the operations used for probability estimation can be determined.

$$H(z) = \gamma z^{-1} \prod_{i=1}^{F} \frac{1 - \zeta_i z^{-1}}{1 - \rho_i z^{-1}} \tag{17}$$

where $\{\rho_i, \zeta_i\}_{i=1}^{F}$ are respectively the poles and zeros of H(z), and constant $\gamma$ is defined so that the condition H(1)=1 is satisfied, i.e., the probability estimation is properly scaled.

The following step is to consider that the poles and zeros are expected to be near unity, and that the while it may be acceptable to have a few integer multiplications, it may be useful to replace all divisions by bit shifts. Under those conditions, the filter may be defined using equation (18)

$$H(z) = \gamma z^{-1} \prod_{i=1}^{F} \frac{1 - (1 - \varphi_i 2^{-\pi_i}) z^{-1}}{1 - (1 - \omega_i 2^{-\mu_i}) z^{-1}} \tag{18}$$

where to satisfy the condition H(1)=1, the following should be $$\gamma = \prod_{i=1}^{F} \frac{2^{(\pi_i - \mu_i)} \omega_i}{\varphi_i} \tag{19}$$

With the definition $$H_0(z) = \gamma z^{-1}, H_i(z) = \frac{1 - (1 - \varphi_i 2^{-\pi_i}) z^{-1}}{1 - (1 - \omega_i 2^{-\mu_i}) z^{-1}}, \quad i = 1, 2, \ldots, F \tag{20}$$

the following can be rewritten as:

$$H(z) = \Pi_{i=0}^{F} H_i(z) \tag{21}$$

and exploit the fact that in this cascade (product) form, the individual filters can be arranged in any order.

With infinite precision, the order of the filters may be irrelevant, but the order of the filters may be important when using only finite precision and integer operations. For instance, when parameter $\gamma$ has factors different from two, it may be simply moved to the first stage, and the integer sequence B[k] may be re-scaled to avoid multiplications or divisions.

In some examples described in the disclosure, the set of parameters $\{\varphi_i, \pi_i, \omega_i, \mu_i\}_{i=1}^{F}$ are all small integers, to minimize the complexity of arithmetic operations (which may be useful for custom hardware), and to simplify the implementations.

Figure 14:
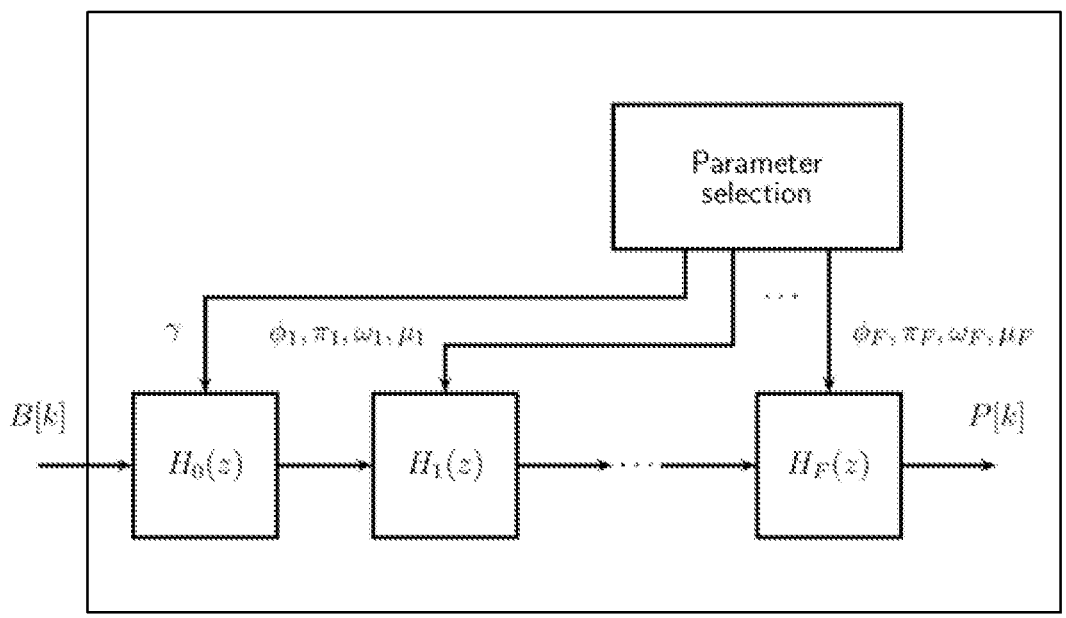
FIG. 14 illustrates an example of a probability estimation filter using cascade filters.

A diagram of the implementation is shown in FIG. 14. For example, FIG. 14 illustrates an example of a probability estimation filter using cascade filters. For example, FIG. 14 illustrates a plurality of filters that each perform the operations of the transfer function $H_i(z)$ to determine bin probabilities of each of bins of a bin stream. As an example, the bin stream may be the binarized bin stream generated in video encoder 20 for purposes of encoding. The bin stream may also be the bin stream that video decoder 30 generates for debinarization to generate the actual video data (e.g., syntax element).

For video decoder 30, a first filter of the plurality of filters receives values based on the bitstream (e.g., bitstream generated by video encoder 20). A last filter of the plurality of filters outputs the bin probability. Each of the other filters receives values from its immediately preceding filter and determines values for its next filter based on the received values and respective parameter values for each of the filters. The last filter receives values from its immediately preceding filter and determines the bin probability based on the received values and parameter values for the last filter. As an example, the respective parameter values for each of the filters may be $\varphi_i$, $\omega_i$, $\pi_i$, and $\mu_i$, but fewer or more parameter values are possible.

For video encoder 20, a first filter of the plurality of filters receives values based on the bin stream (e.g., as generated by the binarizing of the syntax element). A last filter of the plurality of filters outputs the bin probability. Each of the other filters receives values from its immediately preceding filter and determines values for its next filter based on the received values and respective parameter values for each of the filters. The last filter receives values from its immediately preceding filter and determines the bin probability based on the received values and parameter values for the last filter. As an example, the respective parameter values for each of the filters may be $\varphi_i$, $\omega_i$, $\pi_i$, and $\mu_i$, but fewer or more parameter values are possible.

A video coder (e.g., video encoder 20 or video decoder 30) may determine values of $\varphi_i$, $\omega_i$, $\pi_i$, and $\mu_i$, in various ways. For example, the video coder may access one or more predefined tables that map various types of information to values of $\varphi_i$, $\omega_i$, $\pi_i$, and $\mu_i$. For example, the video coder may use a table associated with a particular context to look up values of $\varphi_i$, $\omega_i$, $\pi_i$, and $\mu_i$. In such examples, the one or more tables may be determined based on empirical analysis of video data.

In some examples, techniques of this disclosure may be implemented using entropy encoding unit 218 (FIG. 2). For example, video encoder 20 may receive video data. The video data may comprise one or more pictures. Furthermore, prediction processing unit 200, quantization unit 206, and potentially other components of video encoder 20 may generate syntax elements based on the video data. In this example, entropy encoding unit 218 may receive a syntax element based on the video data, and apply binary arithmetic encoding to the syntax element. In some examples, applying the binary arithmetic encoding may include generating a bin stream by binarizing the syntax element, and determining a bin probability for at least one bin of the bin stream with a plurality of filters. A first filter of the plurality of filters receives values based on the bin stream, a last filter of the plurality of filters outputs the bin probability, each of the other filters receives values from its immediately preceding filter and determines values for its next filter based on the received values and respective parameter values for each of the filters, and the last filter receives values from its immediately preceding filter and determines the bin probability based on the received values and parameter values for the last filter. Applying the binary arithmetic encoding may also include generating a bitstream based on the at least one bin and the bin probability. Entropy encoding unit 218 may output the bitstream.

Furthermore, in some examples, techniques of this disclosure may be implemented using entropy decoding unit 300 (FIG. 3). For example, entropy decoding unit 300 may determine a decoded syntax element by applying binary arithmetic decoding to a bitstream. Applying the binary arithmetic decoding includes generating a bin stream, and generating the bin stream includes determining a bin probability for at least one bin of the bin stream with a plurality of filters. A first filter of the plurality of filters receives values based on the bitstream, a last filter of the plurality of filters outputs the bin probability, each of the other filters receives values from its immediately preceding filter and determines values for its next filter based on the received values and respective parameter values for each of the filters, and the last filter receives values from its immediately preceding filter and determines the bin probability based on the received values and parameter values for the last filter. Entropy decoding unit 300 may debinarize the bin stream to form the decoded syntax element. Prediction processing unit 302 may reconstruct a picture of the video data based in part on the decoded syntax element.

The order of operations may also be important when direct access to the probability estimate is useful to quickly determine the least-probable-symbol. For example, the following equations define a probability estimation FSM, parameterized by positive integer constants a and b, where the probability sequence P[k] is part of the minimal FSM state.

$$Q[k+1] = Q[k] + \left\lfloor \frac{B[k]/2 - Q[k]}{2^a} \right\rfloor, \quad (22)$$

$$P[k+1] = Q[k+1] + (P[k] - Q[k]) + \left\lfloor \frac{B[k] - (P[k] - Q[k])}{2^b} \right\rfloor.$$

A video coder may determine values of the FSM parameters a and b using any of the examples provided elsewhere in this disclosure. Furthermore, in some examples, a video coder may use equation (22) instead of equation (4).

Figure 15:
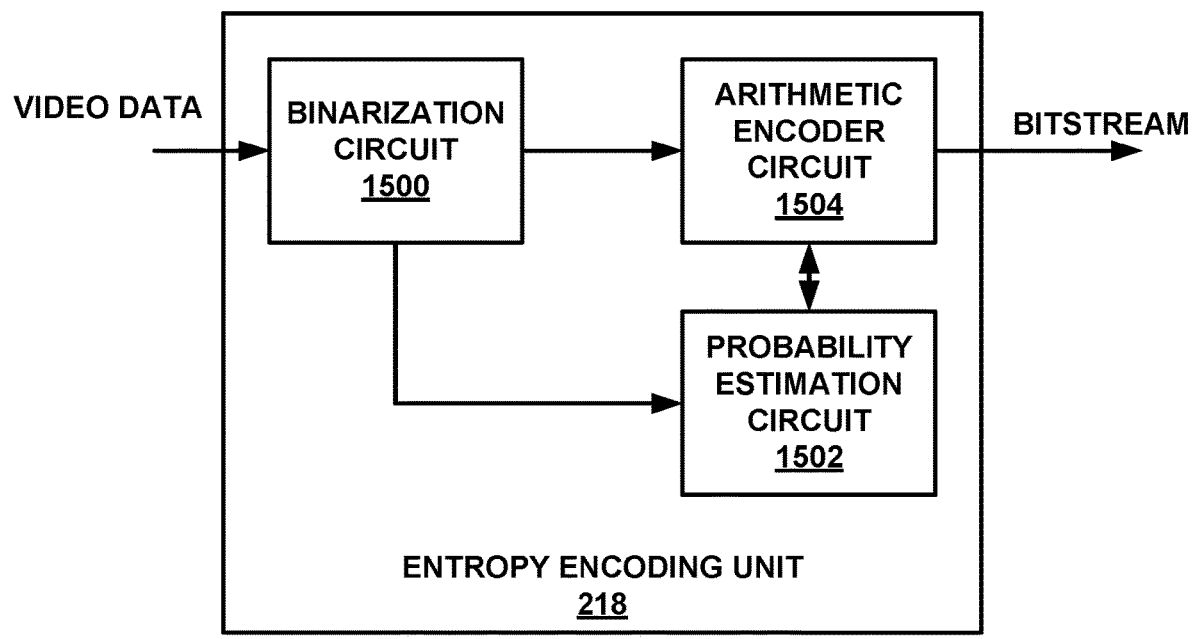
FIG. 15 is a block diagram illustrating an example entropy encoding unit.

FIG. 15 is a block diagram illustrating an example entropy encoding unit. For example, FIG. 15 illustrates one example of entropy encoding unit 218 of FIG. 2 in greater detail. Entropy encoding unit 218 may include additional or fewer components, and the specific interconnections illustrated in FIG. 15 are merely to ease with understanding, and should not be considered limiting. Entropy encoding unit 218 may include binarization circuit 1500 that receives video data (e.g., syntax elements) and performs the binarization process (e.g., a sequence of binary data symbols also called bin values). Probability estimation circuit 1502 may receive the bin values generated by binarization circuit 1500 and may determine the probability for that bin using the example techniques described in this disclosure such as using the cascade filtering technique illustrated and described with respect to FIG. 14. Arithmetic encoder circuit 1504 may entropy encode the binarized data generated by binarization circuit 1500 based on the coding contexts (e.g., probabilities) generated by probability estimation circuit 1502 to generate the bitstream that video encoder 20 outputs.

As an example, probability estimation circuit 1502 may determine a bin probability for at least one bin of the bin stream with a plurality of filters (e.g., $H_i(z)$). A first filter (e.g., $H_0(z)$) of the plurality of filters receives values based on the bin stream. A last filter (e.g., $H_F(z)$) of the plurality of filters outputs the bin probability. Each of the other filters (e.g., $H_1(z)$ to $H_{F-1}(z)$) receives values from its immediately preceding filter and determines values for its next filter based on the received values and respective parameter values for each of the filters (e.g., $\varphi_i$, $\omega_i$, $\pi_i$, and $\mu_i$). The last filter receives values from its immediately preceding filter and determines the bin probability based on the received values and parameter values for the last filter (e.g., $\varphi_F$, $\omega_F$, $\pi_F$, and $\mu_F$).

A transfer function applied by the first filter to generate its values comprises $H_0(z)=\gamma z^{-1}$, where $\gamma$ comprises a parameter for the first filter, and z is the variable for a z-transform. A transfer function applied by each of the filters subsequent to the first filter comprises $$H_i(z) = \frac{1-(1-\varphi_i 2^{-\pi_i})z^{-1}}{1-(1-\omega_i 2^{-\mu_i})z^{-1}},$$

i=1, 2, . . . , F, wherein i indicates the relative order of a filter, wherein $\varphi_i$, $\omega_i$, $\pi_i$, and $\mu_i$ are respective parameter values for the filters. Each one of $\varphi_i$, $\omega_i$, $\pi_i$, and $\mu_i$ may be integers, and in some examples, each one of $\varphi_i$, $\omega_i$, $\pi_i$, and $\mu_i$ may be relatively small integers.

Figure 16:
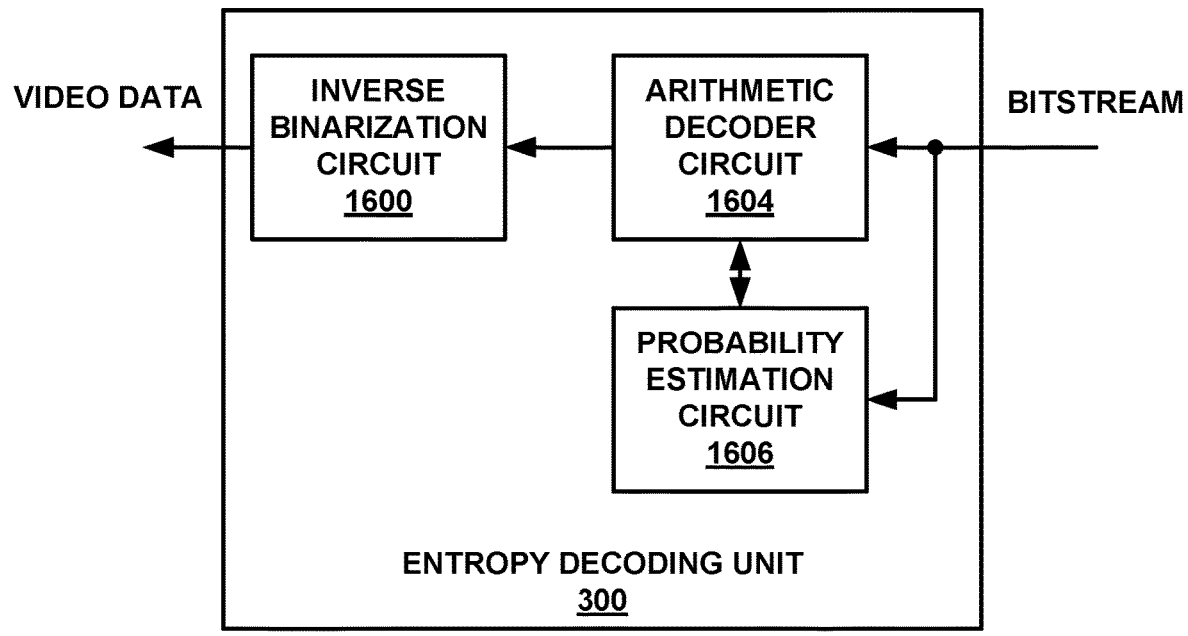
FIG. 16 is a block diagram illustrating an example entropy decoding unit.

FIG. 16 is a block diagram illustrating an example entropy decoding unit. For example, FIG. 16 illustrates one example of entropy decoding unit 300 of FIG. 3 in greater detail. Entropy decoding unit 300 may include additional or fewer components, and the specific interconnections illustrated in FIG. 16 are merely to ease with understanding, and should not be considered limiting. Entropy decoding unit 300 may include arithmetic decoder circuit 1604 that receives a bitstream (e.g., encoded syntax elements) and performs arithmetic decoding based on the coding contexts (e.g., probabilities) determined by probability estimation circuit 1606. As one example, probability estimation circuit 1606 may perform the operations illustrated in FIG. 14 or some form of inverse of those operations. Inverse binarization circuit 1600 receives the output from arithmetic decoder circuit 1604 and performs the inverse binarization process to generate the video data used to reconstruct the pictures.

As an example, probability estimation circuit 1606 determines a bin probability for at least one bin of the bin stream with a plurality of filters (e.g., $H_i(z)$). A first filter (e.g., $H_0(z)$) of the plurality of filters receives values based on the bitstream. A last filter (e.g., $H_F(z)$) of the plurality of filters outputs the bin probability. Each of the other filters (e.g., $H_1(z)$ to $H_{F-1}(z)$) receives values from its immediately preceding filter and determines values for its next filter based on the received values and respective parameter values for each of the filters (e.g., $\varphi_i$, $\omega_i$, $\pi_i$, and $\mu_i$). The last filter receives values from its immediately preceding filter and determines the bin probability based on the received values and parameter values for the last filter (e.g., $\varphi_F$, $\omega_F$, $\pi_F$, and $\mu_F$).

A transfer function applied by the first filter to generate its values comprises $H_0(z)=\gamma z^{-1}$, where $\gamma$ comprises a parameter for the first filter, and z is the variable for a z-transform. A transfer function applied by each of the filters subsequent to the first filter comprises $$H_i(z) = \frac{1-(1-\varphi_i 2^{-\pi_i})z^{-1}}{1-(1-\omega_i 2^{-\mu_i})z^{-1}},$$

i=1, 2, . . . , F, wherein i indicates the relative order of a filter, wherein $\varphi_i$, $\omega_i$, $\pi_i$, and $\mu_i$ are respective parameter values for the filters. Each one of $\varphi_i$, $\omega_i$, $\pi_i$, and $\mu_i$ may be integers, and in some examples, each one of $\varphi_i$, $\omega_i$, $\pi_i$, and $\mu_i$ may be relatively small integers.

The following numbered paragraphs describe particular examples in accordance with techniques of this disclosure.

EXAMPLE 1

A method of decoding video data, the method comprising: determining a decoded syntax element by applying binary arithmetic decoding to a bitstream, wherein applying the binary arithmetic decoding comprises generating a bin stream, wherein generating the bin stream comprises: determining a bin probability for at least one bin of the bin stream with a plurality of filters, wherein a first filter of the plurality of filters receives values based on the bitstream, a last filter of the plurality of filters outputs the bin probability, each of the other filters receives values from its immediately preceding filter and determines values for its next filter based on the received values and respective parameter values for each of the filters, and the last filter receives values from its immediately preceding filter and determines the bin probability based on the received values and parameter values for the last filter; debinarizing the bin stream to form the decoded syntax element; and reconstructing a picture of the video data based in part on the decoded syntax element.

EXAMPLE 2

The method of example 1, wherein the plurality of filters is arranged in a cascade configuration.

EXAMPLE 3

The method of any of examples 1 and 2, wherein a transfer function applied by the first filter to generate its values comprises $H_0(z)=\gamma z^{-1}$, wherein $\gamma$ comprises a parameter for the first filter, and z is the variable for a z-transform.

EXAMPLE 4

The method of any of examples 1-3, wherein a transfer function applied by each of the filters subsequent to the first filter comprises $$H_i(z) = \frac{1-(1-\varphi_i 2^{-\pi_i})z^{-1}}{1-(1-\omega_i 2^{-\mu_i})z^{-1}},$$

i=1, 2, . . . , F, wherein i indicates the relative order of a filter, wherein $\varphi_i$, $\omega_i$, $\pi_i$, and $\mu_i$ are respective parameter values for the filters.

EXAMPLE 5

The method of example 4, wherein each one of $\varphi_i$, $\omega_i$, $\pi_i$, and $\mu_i$ are integers.

EXAMPLE 6

The method of example 4, wherein each one of $\varphi_i$, $\omega_i$, $\pi_i$, and $\mu_i$ are relatively small integers.

EXAMPLE 7

The method of any of examples 1-6, further comprising: determining a least-probable-symbol based at least in part on performing the operations of:

$$Q[k+1] = Q[k] + \left\lfloor \frac{B[k]/2 - Q[k]}{2^a} \right\rfloor,$$

$$P[k+1] = Q[k+1] + (P[k]-Q[k]) + \left\lfloor \frac{B[k]-(P[k]-Q[k])}{2^b} \right\rfloor.$$

EXAMPLE 8

A method of encoding video data, the method comprising: receiving a syntax element based on the video data; applying binary arithmetic encoding to the syntax element, wherein applying the binary arithmetic encoding comprises: generating a bin stream by binarizing the syntax element; determining a bin probability for at least one bin of the bin stream with a plurality of filters, wherein a first filter of the plurality of filters receives values based on the bin stream, a last filter of the plurality of filters outputs the bin probability, each of the other filters receives values from its immediately preceding filter and determines values for its next filter based on the received values and respective parameter values for each of the filters, and the last filter receives values from its immediately preceding filter and determines the bin probability based on the received values and parameter values for the last filter; generating a bitstream based on the at least one bin and the bin probability; and outputting the bitstream.

EXAMPLE 9

The method of example 8, wherein the plurality of filters is arranged in a cascade configuration.

EXAMPLE 10

The method of any of examples 8 and 9, wherein a transfer function applied by the first filter to generate its values comprises $H_0(z)=\gamma z^{-1}$, wherein $\gamma$ comprises a parameter for the first filter, and z is the variable for a z-transform.

EXAMPLE 11

The method of any of examples 8-10, wherein a transfer function applied by each of the filters subsequent to the first filter comprises $$H_i(z) = \frac{1 - (1-\varphi_i 2^{-\pi_i})z^{-1}}{1 - (1-\omega_i 2^{-\mu_i})z^{-1}},$$

i=1, 2, ..., F, wherein i indicates the relative order of a filter, wherein $\varphi_i$, $\omega_i$, $\pi_i$, and $\mu_i$ are respective parameter values for the filters.

EXAMPLE 12

The method of example 11, wherein each one of $\varphi_i$, $\omega_i$, $\pi_i$, and $\mu_i$ are integers.

EXAMPLE 13

The method of example 11, wherein each one of $\varphi_i$, $\omega_i$, $\pi_i$, and $\mu_i$ are relatively small integers.

EXAMPLE 14

The method of any of examples 8-13, further comprising: determining a least-probable-symbol based at least in part on performing the operations of:

$$Q[k+1] = Q[k] + \left\lfloor \frac{B[k]/2 - Q[k]}{2^a} \right\rfloor,$$

$$P[k+1] = Q[k+1] + (P[k] - Q[k]) + \left\lfloor \frac{B[k] - (P[k] - Q[k])}{2^b} \right\rfloor.$$

Figure 17:
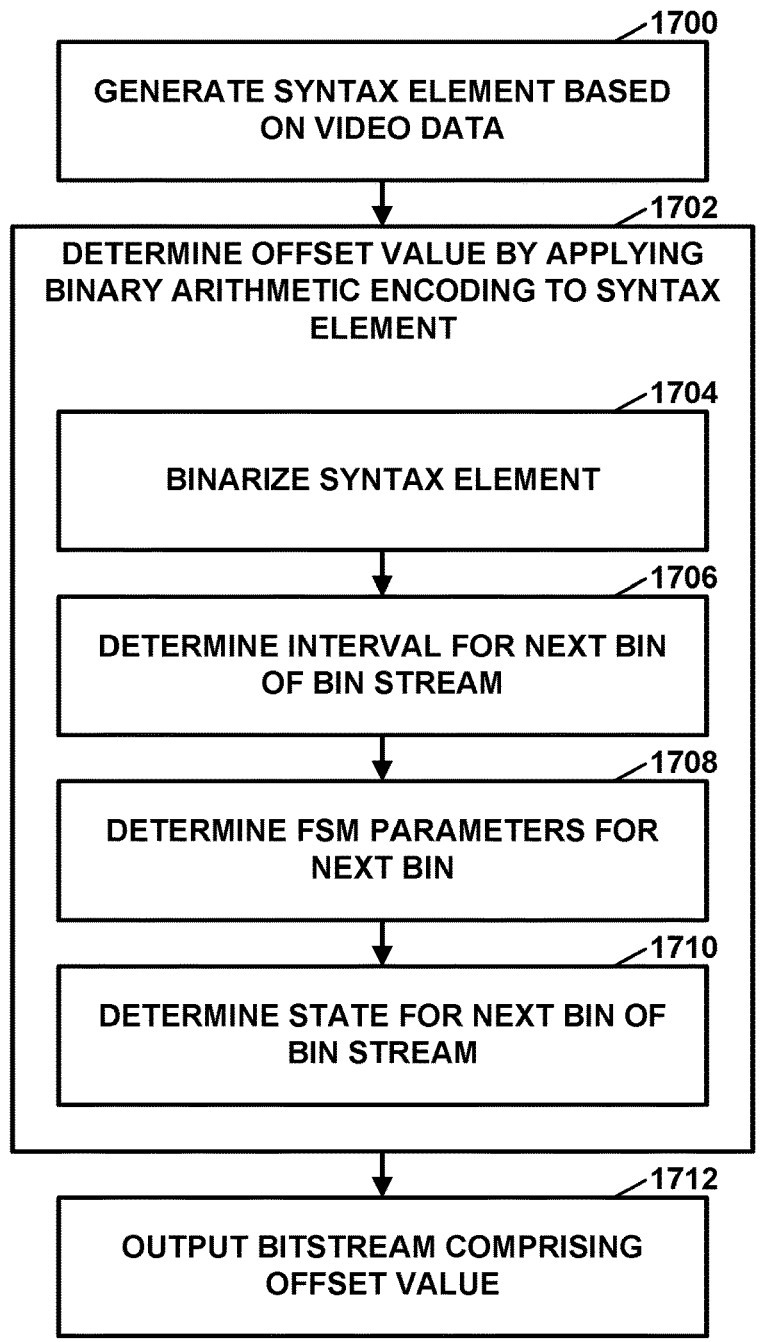
FIG. 17 is a flowchart illustrating an example operation of a video encoder, in accordance with one or more techniques of this disclosure.

FIG. 17 is a flowchart illustrating an example operation of video encoder 20, in accordance with one or more techniques of this disclosure. The flowcharts of this disclosure are provided as examples. Other examples in accordance with techniques of this disclosure may involve more, fewer, or different actions. Moreover, in some examples, particular actions may be performed in different orders or in parallel.

In the example of FIG. 17, video encoder 20 may generate a syntax element based on the video data (1700). For example, video encoder 20 may generate a syntax element that indicates whether a residual value is greater than 1, a syntax element that indicates whether a residual value is greater than 2, or another type of syntax element.

Additionally, video encoder 20 may determine an offset value at least in part by applying binary arithmetic encoding (e.g., CABAC encoding) to the syntax element (1702). As part of applying binary arithmetic encoding to the syntax element, video encoder 20 may generate a bin stream at least in part by binarizing the syntax element (1704). Video encoder 20 may binarize the syntax element in various ways. For example, video encoder 20 may binarize the syntax element using a Truncated Rice binarization process, a k-th order Exp-Golomb binarization process, a fixed-length binarization process, or another type of binarization process. In some examples, video encoder 20 uses different binarization processes for different types of syntax elements. In some examples, the bin stream may include bins generated by binarizing multiple syntax elements.

Furthermore, for at least one respective bin of the bin stream, video encoder 20 may determine an interval for a next bin of the bin stream (1706). In this example, video encoder 20 may determine the interval for the next bin based on a state for the respective bin, an interval for the respective bin, and a value of the respective bin. The state for the respective bin corresponds to an estimate of the probability of the respective bin being a first value and an estimate of the probability of the respective bin being a second, different value. If the respective bin is the first bin after reinitialization, the state for the respective bin is the same as the initial probability estimates associated with a coding context.

In some examples, video encoder 20 may perform the following actions for each respective bin of the bin stream as part of determining the interval for the next bin. Particularly, video encoder 20 may divide, based on the state for the respective bin, the interval for the respective bin into an interval associated with a first symbol and an interval associated with a second symbol. Additionally, video encoder 20 may set one of an upper bound or a lower bound of the interval for the next bin based on whether the value of the respective bin is equal to the first symbol or equal to the second symbol. The upper bound of the interval for the next bin is set to an upper bound of the interval associated with the first symbol and the lower bound of the interval for the next bin is unchanged in response to determining the value of the respective bin is equal to the first symbol. The lower bound of the interval for the next bin is set to a lower bound of the interval associated with the second symbol and the upper bound of the interval for the next bin is unchanged in response to determining the value of the respective bin is equal to the second symbol.

For example, if the respective bin is the first bin after reinitialization, the interval for the respective bin is 0 to 1. In this example, if the state for a first bin indicates that symbol 0 has a 0.6 probability and the symbol 1 has a 0.4 probability, video encoder 20 may divide the interval for the first bin into an interval of 0 to 0.6 and an interval of 0.6 to 1. If the value of the first bin is 0, video encoder 20 may set the upper bound of the interval for the second bin to 0.6 and may set the lower bound of the interval for the second bin to 0. If the value of the first bin is 1, video encoder 20 may set the lower bound of the interval for the second bin to 0.6 and may set the upper bound of the interval for the second bin to 1. Subsequently, if the state for the second bin indicates that the symbol 0 has a 0.7 probability and the symbol 1 has a 0.3 probability, and the interval for the second bin is 0 to 0.6, video encoder 20 may divide the interval for the second bin into an interval of 0 to 0.42 and an interval of 0.42 to 0.6. If the value of the second bin is 0, video encoder 20 may set the upper bound of the interval for a third bin to 0.42 and may set the lower bound of the interval for the third bin to 0. If the value of the second bin is 1, video encoder 20 may set the lower bound of the interval for the third bin to 0.42 and may set the upper bound of the interval for the second bin to 0.6. In some examples, video encoder 20 may use integer values instead of values between 0 and 1.

In addition, video encoder 20 may determine one or more FSM parameters for the next bin of the bin stream (1708). The one or more FSM parameters for the next bin control how probability estimates for the next bin are computed from a state for the respective bin. In some instances, the one or more FSM parameters for a first bin of the bin stream (e.g., the current bin) are different from the one or more FSM parameters for a second bin of the bin stream (e.g., the next bin).

Video encoder 20 may determine the one or more FSM parameters in accordance with any of the examples provided elsewhere in this disclosure. For instance, in one example, as part of determining the one or more FSM parameters for the next bin of the bin stream, video encoder 20 may reinitialize the one or more FSM parameters for the next bin of the bin stream according to a state reinitialization parameter.

In some examples, video encoder 20 modifies the FSM parameters for the next bin of the bin stream according to estimated probability values. In some examples, video encoder 20 modifies the FSM parameters for the next bin based on a measure of past probability variation. In some examples, video encoder 20 determines the one or more FSM parameters for the next bin of the bin stream based on one or more neighboring blocks in the same frame or a previously decoded frame.

In some examples, video encoder 20 performs a process to determine the one or more FSM parameters for each bin of the bin stream. In other examples, video encoder 20 only performs the process to determine the one or more FSM parameters for particular bins of the bin stream. For instance, in one example, video encoder 20 may only perform the process to determine the one or more FSM parameters used in determining the probability estimates for the second bin after reinitialization and may continue using the same one or more FSM parameters until the next reinitialization event. In some examples, video encoder 20 may perform the process to determine the one or more FSM parameters at other times, such as at block boundaries, slice boundaries, and so on.

Video encoder 20 may also use a parameterized state updating function to determine a state for the next bin of the bin stream (1710). The parameterized state updating function that takes as input the state for the respective bin, the one or more FSM parameters for the next bin of the bin stream, and the value of the respective bin. For example, video encoder 20 may determine the state for the next bin using equation (4) or equation (22).

In the example of FIG. 17, the offset value may be equal to a value in the interval for a last bin of the bin stream. Video encoder 20 may output a bitstream comprising the offset value (1712). For instance, video encoder 20 may store or send the bitstream on computer-readable medium 16 (FIG. 1).

Figure 18:
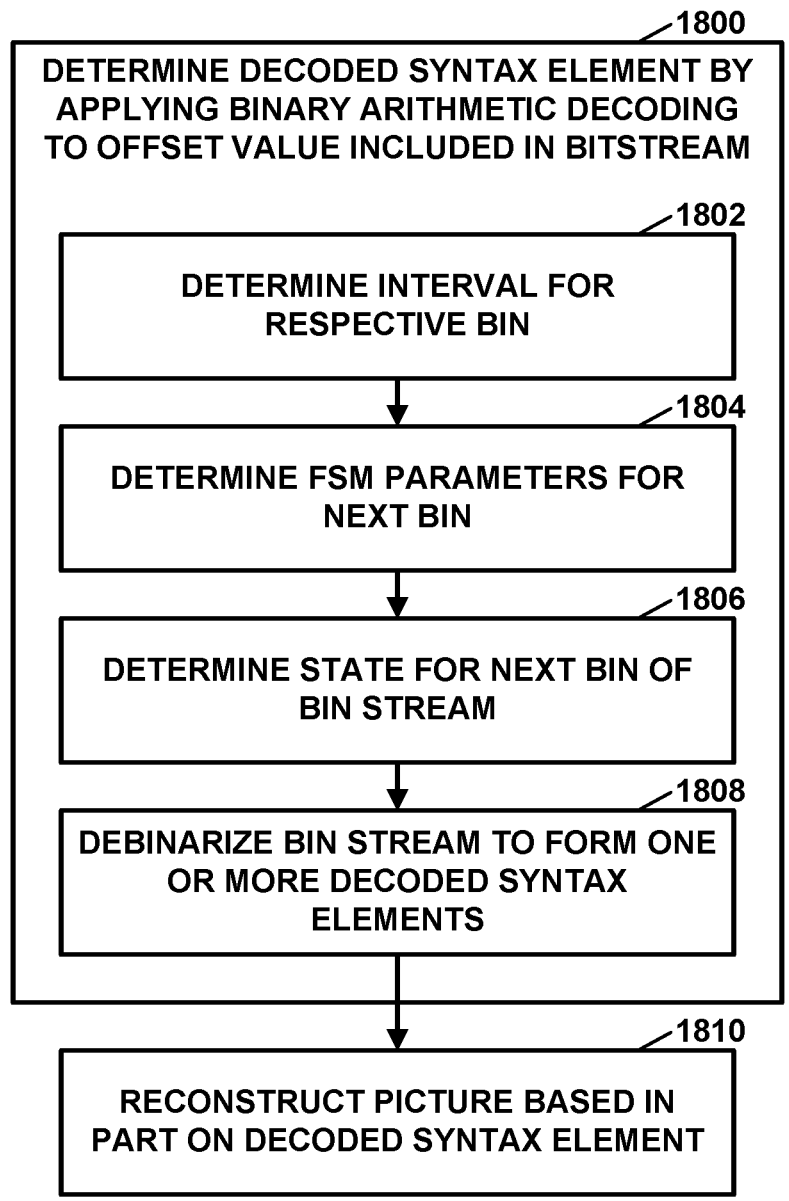
FIG. 18 is a flowchart illustrating an example operation of a video decoder, in accordance with one or more techniques of this disclosure.

FIG. 18 is a flowchart illustrating an example operation of video decoder 30, in accordance with one or more techniques of this disclosure. In the example of FIG. 18, video decoder 30 may receive a bitstream and may determine one or more decoded syntax elements by applying binary arithmetic decoding to an offset value included in a bitstream (1800). As part of determining the one or more decoded syntax elements, video decoder 30 may generate a bin stream. This bin stream may be part of a longer bin stream or the entire bin stream. The bitstream may comprise an encoded representation of video data.

Furthermore, as part of generating the bin stream, video decoder 30 may perform the following actions for at least one respective bin of the bin stream. Particularly, video decoder 30 may determine a value of the respective bin (1802). Video decoder 30 may determine the value of the respective bin, based on a state for the respective bin, an interval for the respective bin, and the offset value. For instance, in one example, for each respective bin of the bin stream, video decoder 30 may determine the value of the respective bin at least in part by dividing, based on the state for the respective bin, the interval for the respective bin into an interval associated with a first symbol and an interval associated with a second symbol. Additionally, video decoder 30 may determine the value of the respective bin based on whether the offset value is in the interval associated with the first symbol or the interval associated with the second symbol. In this example, the value of the respective bin is equal to the first symbol in response to determining the offset value is in the interval associated with the first symbol. Furthermore, in this example, the value of the respective bin is equal to the second symbol in response to determining the offset value is in the interval associated with the second symbol.

For instance, in one specific example, the interval associated with a first bin may be from 0 to 1. In this example, the state for the first bin indicates that the symbol 0 has a 0.6 probability and the state for the second bin indicates that the symbol 1 has a 0.4 probability. Accordingly, in this example, video decoder 30 may divide the interval associated with the first bin into an interval associated with the symbol 0 that ranges from 0 to 0.6 and an interval associated with the symbol 1 that ranges from 0.6 to 1. In this example, if the offset value is between 0 and 0.6, video decoder 30 determines the value of the first bin is equal to 0. If the offset value is between 0.6 and 1, video decoder 30 determines that the value of the first bin is equal to 1. In this example, if the value of the first bin is 0, video decoder 30 may determine that the interval for a second bin is 0 to 0.6. If the value of the first bin is 1, video decoder 30 may determine that the interval for the second bin is 0.6 to 1. Furthermore, supposing that the value of the first bin is equal to 1 and the state for the second bin indicates that the second bin has a 0.7 probability of being the symbol 0 has a 0.3 probability of being the symbol 1, video decoder 30 may divide the interval 0.6 to 1 into an interval from 0.6 to 0.88 corresponding to the symbol 0 and an interval from 0.88 to 1 corresponding to the symbol 0. Thus, if the offset value is between 0.6 and 0.88, video decoder 30 determines that the value of the second bin is 0. If the offset value is between 0.88 and 1, video decoder 30 determines that the value of the second bin is 1. Video decoder 30 may continue this process for each bin of the bin stream. In some examples, video decoder 30 may use integer values instead of values between 0 and 1.

In the example of FIG. 18, video decoder 30 may determine one or more FSM parameters for a next bin of the bin stream (1804). The one or more FSM parameters for the next bin controlling how probability estimates for the next bin are computed from a state for the respective bin. The next bin of the bin stream following the respective bin in the bin stream. In some instances, the one or more FSM parameters for a first bin of the bin stream (e.g., the current bin) are different from the one or more FSM parameters for a second bin of the bin stream (e.g., the next bin).

Video decoder 30 may determine the one or more FSM parameters in accordance with any of the examples described elsewhere in this disclosure. For example, as part of determining the one or more FSM parameters for the next bin, video decoder 30 may reinitialize the FSM parameters for the next bin of the bin stream according to a state reinitialization parameter. In some examples, as part of determining the one or more FSM parameters for the next bin, video decoder 30 may modify the FSM parameters for the next bin of the bin stream according to estimated probability values. In some examples, as part of determining the one or more FSM parameters for the next bin, video modifying the FSM parameters for the next bin of the bin stream based on a measure of past probability variation. In some examples, as part of determining the one or more FSM parameters for the next bin, video decoder 30 may determine the one or more FSM parameters for the next bin of the bin stream based on one or more neighboring blocks in the same frame or a previously decoded frame.

In some examples, video decoder 30 performs a process to determine the one or more FSM parameters for each bin of the bin stream. In other examples, video decoder 30 only performs the process to determine the one or more FSM parameters for particular bins of the bin stream. For instance, in one example, video decoder 30 may only perform the process to determine the one or more FSM parameters used in determining the probability estimates for the second bin after reinitialization and may continue using the same one or more FSM parameters until the next reinitialization event. In some examples, video decoder 30 may perform the process to determine the one or more FSM parameters at other times, such as at block boundaries, slice boundaries, and so on.

Furthermore, video decoder 30 may determine a state for the next bin of the bin stream (1806). Video decoder 30 may use a parameterized state updating function that takes as input the state for the respective bin, the one or more FSM parameters for the next bin of the bin stream, and the value of the respective bin. For example, video encoder 20 may determine the state for the next bin using equation (4) or equation (22).

Additionally, video decoder 30 may debinarize the bin stream to form the one or more decoded syntax elements (1808). As mentioned elsewhere in this disclosure, syntax elements may be binarized using various processes, such as a Truncated Rice binarization process, a k-th order Exp-Golomb binarization process, a fixed-length binarization process, or another type of binarization process. These processes map values of syntax elements to binary codes. To debinarize the bin stream, video decoder 30 may look up the values corresponding to the binary codes in the bin stream.

In the example of FIG. 18, video decoder 30 may reconstruct a picture of the video data based in part on the one or more decoded syntax elements (1810). For example, if the decoded syntax elements indicate whether remainder values for residual data, video decoder 30 may use the remainder values to determine to values of residual samples. In this example, video decoder 30 may use the residual samples and corresponding predictive samples to reconstruct sample values of the picture, as described elsewhere in this disclosure. In some examples, the decoded syntax elements may include syntax elements that indicate whether blocks are encoded with intra prediction or inter prediction. In such examples, video decoder 30 may use such syntax elements to determine whether to reconstruct the blocks using intra prediction or inter prediction.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a decoded syntax element by applying binary arithmetic decoding to an offset value included in a bitstream, wherein applying the binary arithmetic decoding comprises:
   generating a bin stream, wherein generating the bin stream comprises:
   for at least one respective bin of the bin stream:
   determining a value of the respective bin based on a state for the respective bin, an interval for the respective bin, and the offset value;
   determining one or more Finite State Machine (FSM) parameters for a next bin of the bin stream, the one or more FSM parameters for the next bin controlling how probability estimates for the next bin are computed from the state for the respective bin, the next bin of the bin stream following the respective bin in the bin stream; and
   determining a state for the next bin of the bin stream using a parameterized state updating function that takes as input the state for the respective bin, the one or more FSM parameters for the next bin of the bin stream, and the value of the respective bin, wherein determining the state for the next bin of the bin stream comprises:
   determining the state for the next bin according to the following equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin; and
   debinarizing the bin stream to form the decoded syntax element; and
   reconstructing a picture of the video data based in part on the decoded syntax element.

2. The method of claim 1, wherein determining the one or more FSM parameters for the next bin of the bin stream comprises:
   reinitializing the FSM parameters for the next bin of the bin stream according to a state reinitialization parameter.

3. The method of claim 1, wherein determining the one or more FSM parameters for the next bin of the bin stream comprises:
   modifying the FSM parameters for the next bin of the bin stream according to estimated probability values.

4. The method of claim 1, wherein determining the one or more FSM parameters for the next bin comprises, modifying the FSM parameters for the next bin based on a measure of past probability variation.

5. The method of claim 4, wherein the measure of past probability variation is computed by summing absolute differences between probabilities estimated using an estimation variation measure for the particular bin defined as:

$$\sigma[k+1] = \sigma[k] + \left\lfloor \frac{|q_1[k] - q_2[k]| - \sigma[k]}{2^c} \right\rfloor$$

where σ[k+1] is the estimation variation measure for the next bin of the bin stream, σ[k] is an estimation variation measure for the particular bin, $q_1[k]$ is a first probability estimate for the particular bin, $q_2[k]$ is a second probability estimate for the particular bin, and c is a parameter.

6. The method of claim 1, wherein determining the one or more FSM parameters for the next bin of the bin stream comprises:
determining the one or more FSM parameters for the next bin of the bin stream based on one or more neighboring blocks in the same frame or a previously decoded frame.

7. The method of claim 1, wherein, for each respective bin of the bin stream, determining the value of the respective bin comprises:
dividing, based on the state for the respective bin, the interval for the respective bin into an interval associated with a first symbol and an interval associated with a second symbol; and
determining the value of the respective bin based on whether the offset value is in the interval associated with the first symbol or the interval associated with the second symbol,
wherein the value of the respective bin is equal to the first symbol in response to determining the offset value is in the interval associated with the first symbol, and
wherein the value of the respective bin is equal to the second symbol in response to determining the offset value is in the interval associated with the second symbol.

8. The method of claim 1, further comprising receiving the bitstream.

9. The method of claim 1, wherein the one or more FSM parameters for a first bin of the bin stream are different from the one or more FSM parameters for a second bin of the bin stream.

10. A method of encoding video data, the method comprising:
generating a syntax element based on the video data;
determining an offset value at least in part by applying binary arithmetic encoding to the syntax element, wherein applying the binary arithmetic encoding comprises:
generating a bin stream at least in part by:
binarizing the syntax element;
for at least one respective bin of the bin stream:
determining an interval for a next bin of the bin stream based on a state for the respective bin, an interval for the respective bin, and a value of the respective bin;
determining one or more Finite State Machine (FSM) parameters for the next bin of the bin stream, the one or more FSM parameters for the next bin controlling how probability estimates for the next bin are computed from the state for the respective bin; and
determining a state for the next bin of the bin stream using a parameterized state updating function that takes as input the state for the respective bin, the one or more FSM parameters for the next bin of the bin stream, and the value of the respective bin, wherein determining the state for the next bin of the bin stream comprises:
determining the state for the next bin according to the following equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin;
wherein the offset value is equal to a value in the interval for a last bin of the bin stream; and
outputting a bitstream comprising the offset value.

11. The method of claim 10, wherein determining the one or more FSM parameters for the next bin of the bin stream comprises reinitializing the FSM parameters for the next bin of the bin stream according to a state reinitialization parameter.

12. The method of claim 10, wherein determining the one or more FSM parameters for the next bin of the bin stream comprises modifying the FSM parameters for the next bin of the bin stream according to estimated probability values.

13. The method of claim 10, wherein determining the one or more FSM parameters for the next bin of the bin stream comprises modifying the FSM parameters for the next bin of the bin stream based on a measure of past probability variation.

14. The method of claim 13, wherein the measure of past probability variation is computed by summing absolute differences between probabilities estimated using an estimation variation measure for the particular bin defined as:

$$\sigma[k+1] = \sigma[k] + \left\lfloor \frac{|q_1[k] - q_2[k]| - \sigma[k]}{2^c} \right\rfloor$$

where σ[k+1] is the estimation variation measure for the next bin of the bin stream, σ[k] is an estimation variation measure for the particular bin, $q_1[k]$ is a first probability estimate for the particular bin, $q_2[k]$ is a second probability estimate for the particular bin, and c is a parameter.

15. The method of claim 10, wherein determining the one or more FSM parameters for the next bin of the bin stream comprises determining the one or more FSM parameters for the next bin of the bin stream based on one or more neighboring blocks in the same frame or a previously decoded frame.

16. The method of claim 10, wherein, for each respective bin of the bin stream, determining the interval for the next bin of the bin stream comprises:
dividing, based on the state for the respective bin, the interval for the respective bin into an interval associated with a first symbol and an interval associated with a second symbol; and
setting one of an upper bound or a lower bound of the interval for the next bin based on whether the value of the respective bin is equal to the first symbol or equal to the second symbol, wherein the upper bound of the interval for the next bin is set to an upper bound of the interval associated with the first symbol and the lower bound of the interval for the next bin is unchanged in response to determining the value of the respective bin is equal to the first symbol, and wherein the lower bound of the interval for the next bin is set to a lower bound of the interval associated with the second symbol and the upper bound of the interval for the next bin is unchanged in response to determining the value of the respective bin is equal to the second symbol.

17. The method of claim 10, wherein the one or more FSM parameters for a first bin of the bin stream are different from the one or more FSM parameters for a second bin of the bin stream.

18. An apparatus for decoding video data, the apparatus comprising:

one or more storage media configured to store video data; and one or more processors configured to:

determine a decoded syntax element by applying binary arithmetic decoding to an offset value included in a bitstream, wherein the one or more processors are configured such that, as part of applying the binary arithmetic decoding, the one or more processors:

generate a bin stream, wherein, as part of generating the bin stream, the one or more processors:

for at least one respective bin of the bin stream:

determine a value of the respective bin based on a state for the respective bin, an interval for the respective bin, and the offset value;

determine one or more Finite State Machine (FSM) parameters for a next bin of the bin stream, the one or more FSM parameters for the next bin controlling how probability estimates for the next bin are computed from the state for the respective bin, the next bin of the bin stream following the respective bin in the bin stream; and determine a state for the next bin of the bin stream using a parameterized state updating function that takes as input the state for the respective bin, the one or more FSM parameters for the next bin of the bin stream, and the value of the respective bin, wherein the one or more processors are configured to determine the state for the next bin according to the following equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin; and debinarize the bin stream to form the decoded syntax element; and reconstruct a picture of the video data based in part on the decoded syntax element.

19. The apparatus of claim 18, wherein the one or more processors are configured such that, as part of determining the one or more FSM parameters for the next bin of the bin stream, the one or more processors reinitialize the FSM parameters for the next bin of the bin stream according to a state reinitialization parameter.

20. The apparatus of claim 18, wherein the one or more processors are configured such that, as part of determining the one or more FSM parameters for the next bin of the bin stream, the one or more processors modify the FSM parameters for the next bin of the bin stream according to estimated probability values.

21. The apparatus of claim 18, wherein the one or more processors are configured such that, as part of determining the one or more FSM parameters for the next bin, the one or more processors modify the FSM parameters for the next bin based on a measure of past probability variation.

22. The apparatus of claim 21, wherein the one or more processors are configured such that the measure of past probability variation is computed by summing absolute differences between probabilities estimated using an estimation variation measure for the particular bin defined as:

$$\sigma[k+1] = \sigma[k] + \left\lfloor \frac{|q_1[k] - q_2[k]| - \sigma[k]}{2^c} \right\rfloor$$

whereσ[k+1] is the estimation variation measure for the next bin of the bin stream, σ[k] is an estimation variation measure for the particular bin, $q_1[k]$ is a first probability estimate for the particular bin, $q_2[k]$ is a second probability estimate for the particular bin, and c is a parameter.

23. The apparatus of claim 18, wherein the one or more processors are configured such that, as part of determining the one or more FSM parameters for the next bin of the bin stream, the one or more processors determine the one or more FSM parameters for the next bin of the bin stream based on one or more neighboring blocks in the same frame or a previously decoded frame.

24. The apparatus of claim 18, wherein, for each respective bin of the bin stream, the one or more processors are configured such that, as part of determining the value of the respective bin, the one or more processors:

divide, based on the state for the respective bin, the interval for the respective bin into an interval associated with a first symbol and an interval associated with a second symbol; and determine the value of the respective bin based on whether the offset value is in the interval associated with the first symbol or the interval associated with the second symbol, wherein the value of the respective bin is equal to the first symbol in response to determining the offset value is in the interval associated with the first symbol, and wherein the value of the respective bin is equal to the second symbol in response to determining the offset value is in the interval associated with the second symbol.

25. The apparatus of claim 18, wherein the one or more processors are further configured to receive the bitstream.

26. The apparatus of claim 18, wherein the one or more FSM parameters for a first bin of the bin stream are different from the one or more FSM parameters for a second bin of the bin stream.

27. The apparatus of claim 18, wherein the apparatus comprises:
an integrated circuit,
a microprocessor, or
a wireless communication device.

28. An apparatus for encoding video data, the apparatus comprising:
one or more storage media configured to store video data; and
one or more processing circuits coupled to the one or more storage media, the one or more processing circuits configured to:
generate a syntax element based on the video data;
determine an offset value at least in part by applying binary arithmetic encoding to the syntax element, wherein the one or more processors are configured such that, as part of applying the binary arithmetic encoding, the one or more processors generate a bin stream at least in part by:
binarizing the syntax element; and
for at least one respective bin of the bin stream:
determine an interval for a next bin of the bin stream based on a state for the respective bin, an interval for the respective bin, and a value of the respective bin;
determine one or more Finite State Machine (FSM) parameters for the next bin of the bin stream, the one or more FSM parameters for the next bin controlling how probability estimates for the next bin are computed from the state for the respective bin; and
determine a state for the next bin of the bin stream using a parameterized state updating function that takes as input the state for the respective bin, the one or more FSM parameters for the next bin of the bin stream, and the value of the respective bin, wherein the one or more processors are configured such that, as part of determining the state for the next bin of the bin stream, the one or more processors:
determine the state for the next bin of the bin stream according to the following equations:

$$q_1[k+1] = p[k] + \left\lfloor \frac{2^{15}b[k] - q_1[k]}{2^a} \right\rfloor,$$

$$q_2[k+1] = p[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor,$$

where p[k+1] is the state for the next bin of the bin stream, p[k] is the state for the respective bin, b[k] is the value of the respective bin, a is a first parameter of the one or more FSM parameters for the next bin of the bin stream, and b is a second parameter of the one or more FSM parameters for the next bin of the bin stream,
wherein the offset value is equal to a value in the interval for a last bin of the bin stream; and
output a bitstream comprising the offset value.

29. The apparatus of claim 28, wherein the one or more processors are configured such that, as part of determining the one or more FSM parameters for the next bin of the bin stream, the one or more processors reinitialize the FSM parameters for the next bin of the bin stream according to a state reinitialization parameter.

30. The apparatus of claim 28, wherein the one or more processors are configured such that, as part of determining the one or more FSM parameters for the next bin of the bin stream, the one or more processors modify the FSM parameters for the next bin of the bin stream according to estimated probability values.

31. The apparatus of claim 28, wherein the one or more processors are configured such that, as part of determining the one or more FSM parameters for the next bin of the bin stream, the one or more processors modify the FSM parameters for the next bin of the bin stream based on a measure of past probability variation.

32. The apparatus of claim 31, wherein the one or more processors are configured such that the measure of past probability variation is computed by summing absolute differences between probabilities estimated using an estimation variation measure for the particular bin defined as:

$$\sigma[k+1] = \sigma[k] + \left\lfloor \frac{|q_1[k] - q_2[k]| - \sigma[k]}{2^c} \right\rfloor$$

where σ[k+1] is the estimation variation measure for the next bin of the bin stream, σ[k] is an estimation variation measure for the particular bin, $q_1[k]$ is a first probability estimate for the particular bin, $q_2[k]$ is a second probability estimate for the particular bin, and c is a parameter.

33. The apparatus of claim 28, wherein the one or more processors are configured such that, as part of determining the one or more FSM parameters for the next bin of the bin stream, the one or more processors determine the one or more FSM parameters for the next bin of the bin stream based on one or more neighboring blocks in the same frame or a previously decoded frame.

34. The apparatus of claim 28, wherein, for each respective bin of the bin stream, the one or more processors are configured such that, as part of determining the interval for the next bin of the bin stream, the one or more processors:
divide, based on the state for the respective bin, the interval for the respective bin into an interval associated with a first symbol and an interval associated with a second symbol; and
set one of an upper bound or a lower bound of the interval for the next bin based on whether the value of the respective bin is equal to the first symbol or equal to the second symbol,
wherein the upper bound of the interval for the next bin is set to an upper bound of the interval associated with the first symbol and the lower bound of the interval for the next bin is unchanged in response to determining the value of the respective bin is equal to the first symbol,
wherein the lower bound of the interval for the next bin is set to a lower bound of the interval associated with the second symbol and the upper bound of the interval for the next bin is unchanged in response to determining the value of the respective bin is equal to the second symbol.

35. The apparatus of claim 28, wherein the one or more FSM parameters for a first bin of the bin stream are different from the one or more FSM parameters for a second bin of the bin stream.

36. The apparatus of claim 28, wherein the apparatus comprises:
an integrated circuit,
a microprocessor, or
a wireless communication device.

37. An apparatus for decoding video data, the apparatus comprising:
means for determining a decoded syntax element by applying binary arithmetic decoding to an offset value included in a bitstream, wherein applying the binary arithmetic decoding comprises:
generating a bin stream, wherein generating the bin stream comprises:
for at least one respective bin of the bin stream:
determining a value of the respective bin based on a state for the respective bin, an interval for the respective bin, and the offset value;
determining one or more Finite State Machine (FSM) parameters for a next bin of the bin stream, the one or more FSM parameters for the next bin controlling how probability estimates for the next bin are computed from the state for the respective bin, the next bin of the bin stream following the respective bin in the bin stream; and
determining a state for the next bin of the bin stream using a parameterized state updating function that takes as input the state for the respective bin, the one or more FSM parameters for the next bin of the bin stream, and the value of the respective bin, wherein determining the state for the next bin of the bin stream comprises:
determining the state for the next bin according to the following equations:

$$q_1[k+1] = p[k] + \left\lfloor \frac{2^{15}b[k] - q_1[k]}{2^a} \right\rfloor,$$

$$q_2[k+1] = p[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin; and
debinarizing the bin stream to form the decoded syntax element; and
means for reconstructing a picture of the video data based in part on the decoded syntax element.

38. An apparatus for encoding video data, the apparatus comprising:
means for generating a syntax element based on the video data;
means for determining an offset value at least in part by applying binary arithmetic encoding to the syntax element, wherein applying the binary arithmetic encoding comprises generating a bin stream at least in part by:
binarizing the syntax element; and
for at least one respective bin of the bin stream:
determining an interval for a next bin of the bin stream based on a state for the respective bin, an interval for the respective bin, and a value of the respective bin;
determining one or more Finite State Machine (FSM) parameters for the next bin of the bin stream, the one or more FSM parameters for the next bin controlling how probability estimates for the next bin are computed from the state for the respective bin; and
determining a state for the next bin of the bin stream using a parameterized state updating function that takes as input the state for the respective bin, the one or more FSM parameters for the next bin of the bin stream, and the value of the respective bin, wherein determining the state for the next bin of the bin stream comprises:
determining the state for the next bin according to the following equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin,
wherein the offset value is equal to a value in the interval for a last bin of the bin stream; and
means for outputting a bitstream comprising the offset value.

39. A non-transitory computer-readable storage medium storing instructions that, when executed, cause one or more processors to:
determine a decoded syntax element by applying binary arithmetic decoding to an offset value included in a bitstream, wherein as part of causing the one or more processors to apply the binary arithmetic decoding, execution of the instructions causes the one or more processors to:
generate a bin stream, wherein as part of causing the one or more processors to generate the bin stream, execution of the instructions causes the one or more processors to:
for at least one respective bin of the bin stream:
determine a value of the respective bin based on a state for the respective bin, an interval for the respective bin, and the offset value;
determine one or more Finite State Machine (FSM) parameters for a next bin of the bin stream, the one or more FSM parameters for the next bin controlling how probability estimates for the next bin are computed from the state for the respective bin, the next bin of the bin stream following the respective bin in the bin stream; and determine a state for the next bin of the bin stream using a parameterized state updating function that takes as input the state for the respective bin, the one or more FSM parameters for the next bin of the bin stream, and the value of the respective bin, wherein determining the state for the next bin of the bin stream comprises:
determining the state for the next bin according to the following equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin; and debinarize the bin stream to form the decoded syntax element; and reconstruct a picture of the video data based in part on the decoded syntax element.

40. A non-transitory computer-readable storage medium storing instructions that, when executed, cause one or more processors to:

generate a syntax element based on video data;

determine an offset value at least in part by applying binary arithmetic encoding to the syntax element, wherein as part of causing the one or more processors to apply the binary arithmetic encoding, execution of the instructions causes the one or more processors to generate a bin stream at least in part by causing the one or more processors to:

binarize the syntax element; and for at least one respective bin of the bin stream:
determine an interval for a next bin of the bin stream based on a state for the respective bin, an interval for the respective bin, and a value of the respective bin;

determine one or more Finite State Machine (FSM) parameters for the next bin of the bin stream, the one or more FSM parameters for the next bin controlling how probability estimates for the next bin are computed from the state for the respective bin; and determine a state for the next bin of the bin stream using a parameterized state updating function that takes as input the state for the respective bin, the one or more FSM parameters for the next bin of the bin stream, and the value of the respective bin, wherein determining the state for the next bin of the bin stream comprises:

determining the state for the next bin according to the following equations:

$$q_1[k+1] = q_1[k] + \left\lfloor \frac{2^{15}b[k] - q_1[k]}{2^a} \right\rfloor,$$

$$q_2[k+1] = q_2[k] + \left\lfloor \frac{2^{15}b[k] - q_2[k]}{2^b} \right\rfloor,$$

$$p[k+1] = \left\lfloor \frac{q_1[k+1] + q_2[k+1]}{2} \right\rfloor$$

where p[k+1] is the state for the next bin of the bin stream, p[k] is the state for the respective bin, b[k] is the value of the respective bin, a is a first parameter of the one or more FSM parameters for the next bin, and b is a second parameter of the one or more FSM parameters for the next bin, wherein the offset value is equal to a value in the interval for a last bin of the bin stream; and output a bitstream comprising the offset value.

* * * * *